US009483306B2

(12) United States Patent
Tajima et al.

(10) Patent No.: US 9,483,306 B2
(45) Date of Patent: Nov. 1, 2016

(54) PREDICTIVE SEQUENTIAL CALCULATION DEVICE

(75) Inventors: Yoshiyuki Tajima, Tokyo (JP); Koichiro Iijima, Tokyo (JP); Tohru Watanabe, Tokyo (JP); Takaharu Ishida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 357 days.

(21) Appl. No.: 14/237,312

(22) PCT Filed: Aug. 26, 2011

(86) PCT No.: PCT/JP2011/004750
§ 371 (c)(1),
(2), (4) Date: Feb. 5, 2014

(87) PCT Pub. No.: WO2013/030860
PCT Pub. Date: Mar. 7, 2013

(65) Prior Publication Data
US 2014/0189416 A1   Jul. 3, 2014

(51) Int. Cl.
| G06F 9/48 | (2006.01) |
| G06F 9/50 | (2006.01) |
| G06F 11/30 | (2006.01) |
| G06F 11/34 | (2006.01) |

(Continued)

(52) U.S. Cl.
CPC ........... *G06F 9/4881* (2013.01); *G06F 9/4887* (2013.01); *G06F 9/5027* (2013.01); *G06F 1/26* (2013.01); *G06F 11/30* (2013.01); *G06F 11/34* (2013.01); *H02J 4/00* (2013.01)

(58) Field of Classification Search
CPC .. G06F 9/4881; G06F 9/4887; G06F 9/5027;
G06F 1/26; G06F 11/30; G06F 11/34;
H04L 4/00
See application file for complete search history.

(56) References Cited

U.S. PATENT DOCUMENTS 5,978,832 A * 11/1999 Sirkin ................. G06F 11/3419
713/502
6,112,221 A    8/2000 Bender et al.
(Continued)

FOREIGN PATENT DOCUMENTS

| JP | 10-149203 A | 6/1998 |
| JP | 11-039173 A | 2/1999 |

(Continued)

OTHER PUBLICATIONS

Extended European Search Report dated May 30, 2016 for European Patent Application No. 11871816.2.

*Primary Examiner* — Benjamin Wu
(74) *Attorney, Agent, or Firm* — Volpe and Koenig, P.C.

(57) ABSTRACT

A calculation device is provided that executes calculations within real-time restrictions. The calculation device implements a step of predicting a processing time of a calculation related to the amount and property of input data based on a prediction model; a step of adjusting the processing time by decreasing the amount of data used for the calculation or decreasing the number of iterative calculations when the processing time exceeds a time slice allocated to the calculation; a step of executes the calculation using the adjusted processing time; a step of updating, as required, the prediction model used for predicting the processing time according to the result of the calculation which is executed in a period where the calculation is not performed while implementing a change of the amount of data or the number of iterative calculations or change to an approximation.

15 Claims, 39 Drawing Sheets

(51) Int. Cl.
*G06F 1/26* (2006.01)
*H02J 4/00* (2006.01)

(56) References Cited

U.S. PATENT DOCUMENTS

| | | | | |
|---|---|---|---|---|
| 6,618,742 | B1* | 9/2003 | Krum | G06F 9/505 |
| | | | | 702/186 |
| 7,035,971 | B1* | 4/2006 | Merchant | G06F 11/3433 |
| | | | | 711/112 |
| 7,140,016 | B2 | 11/2006 | Milovanovic et al. | |
| 7,165,129 | B1* | 1/2007 | Okmianski | G06F 17/30312 |
| | | | | 710/29 |
| 8,645,425 | B1* | 2/2014 | Brown | G06F 17/30306 |
| | | | | 707/788 |
| 2003/0200251 | A1* | 10/2003 | Krum | G06F 9/505 |
| | | | | 718/102 |
| 2007/0226742 | A1 | 9/2007 | Hung et al. | |
| 2008/0184248 | A1* | 7/2008 | Barua | G06F 9/4843 |
| | | | | 718/104 |
| 2010/0169489 | A1* | 7/2010 | Akiyama | G06F 9/5061 |
| | | | | 709/226 |
| 2010/0262975 | A1* | 10/2010 | Reysa | G06F 9/5077 |
| | | | | 718/105 |
| 2011/0113291 | A1* | 5/2011 | Ike | G06F 11/3636 |
| | | | | 714/45 |
| 2011/0154073 | A1* | 6/2011 | Wang | G06F 9/505 |
| | | | | 713/320 |
| 2014/0198658 | A1* | 7/2014 | Ajima | H04L 43/0888 |
| | | | | 370/235 |

FOREIGN PATENT DOCUMENTS

| | | |
|---|---|---|
| JP | 11-259433 A | 9/1999 |
| JP | 2010-152738 A | 7/2010 |
| JP | 2011-100388 A | 5/2011 |
| WO | 2009/078428 A1 | 6/2009 |

* cited by examiner

Fig.6

| Task ID (2D011) | Execution binary (2D012) | Static priority (2D013) | Dynamic priority (2D014) | Priority (2D015) |
|---|---|---|---|---|
| 1001 | 0101001011... | 15 | 3 | 18 |
| 1002 | 0010100101... | 23 | 1 | 24 |
| ... | ... | ... | ... | ... |

Fig.7

| Task ID | Processing time prediction model ID | Processing time prediction basis function | Processing time prediction parameter |
|---|---|---|---|
| 1001 | 0 | 1 | 2.5 |
| 1001 | 1 | $x_1$ | 6.7 |
| 1001 | 2 | $x_2$ | 6.7 |
| 1001 | 3 | $x_1 x_2$ | 1.1 |
| 1001 | ... | ... | ... |
| 1001 | 8 | $x_1^2 x_2^2$ | 0.2 |
| 1002 | 0 | 1 | 1.3 |
| ... | ... | ... | ... |

| Task ID | Convergence number prediction model ID | Convergence number prediction basis function | Convergence number prediction parameter |
|---|---|---|---|
| 1001 | 0 | $1$ | 2.5 |
| 1001 | 1 | $x_1$ | 3.2 |
| 1001 | 2 | $x_1^2$ | 1.9 |
| 1002 | 0 | $1$ | 2.9 |
| ... | ... | ... | ... |

| Equipment ID | Cluster ID | Mixing ratio | Mean | Variance |
|---|---|---|---|---|
| 2M031 | 2M032 | 2M033 | 2M034 | 2M035 |

Fig.12

| Task ID | Execution time | Stream input amount | Thin-out amount | Additional allocation time |
|---|---|---|---|---|
| 2M041 | 2M042 | 2M043 | 2M044 | 2M045 |

Fig.28

| Starting equipment ID (2D031) | Terminating equipment ID (2D032) |
|---|---|
| 10 | 101 |
| 101 | 102 |
| ... | ... |

Fig.29

| Equipment ID | Equipment type | Effective power | Reactive power | Phase | Current | Voltage |
|---|---|---|---|---|---|---|
| 22M021 | 22M022 | 22M023 | 22M024 | 22M025 | 22M026 | 22M027 |

Fig.30

| Equipment ID | Equipment type | Effective power | Reactive power | Phase | Current | Voltage |
|---|---|---|---|---|---|---|
| 22M031 | 22M032 | 22M033 | 22M034 | 22M035 | 22M036 | 22M037 |

PREDICTIVE SEQUENTIAL CALCULATION DEVICE

TECHNICAL FIELD

The present invention relates to a calculation device that sequentially calculates data that are input in real-time, and particularly, to a sequential calculation device having a management function for completing calculation under prescribed real-time restrictions.

BACKGROUND ART

In control of power equipments, production equipments in factories, and robots, a number of processes are calculated under real-time restrictions that the processes should be finished in a prescribed period. Among these calculations, a relative complex calculation such as device state estimation or disorder clustering includes iterative calculations and has characteristics that the processing time changes greatly according to the amount of data used and the property thereof.

In particular, a mission critical system like a social infrastructure that operates for a long period without stopping has to complete calculations while satisfying the real-time restrictions in order to guarantee safety even when the number of processes increases in the event of calamity or when a system expansion which was not planned in the original design and development stages occurs.

Patent Literature 1 discloses a technique of changing the level of processes by taking a change in processing time into consideration. This literature discloses a technique of enabling a plurality of stages of calculations to be executed smoothly by switching to approximations based on a congestion state of a queue that stores the calculation results of previous stages and the rate of occurrence of an event that it was not possible to perform a calculation of a subsequent stage in a state where a calculation of the previous stage has not been finished.

CITATION LIST

Patent Literature

[PTL 1]
WO 09/078,428

SUMMARY OF INVENTION

Technical Problem

However, the technique disclosed in Patent Literature 1 aims to suppress a throughput fluctuation of nodes that perform calculation and decreases the processing load of a specific node where a processing delay occurs. Thus, it can be said that the technique does not perform control from the perspective of how to complete the entire process until deadline by taking the real-time restrictions into consideration. Moreover, according to the technique of Patent Literature 1, there is a possibility that it is not possible to satisfy the real-time restrictions in a transitional period where the processing time starts increasing because the technique is based on the facts that a congestion occurs as a result of calculations and a calculation results in a failure due to the congested calculation.

The present invention has been made in view of the above problems and an object of the present invention is to provide a calculation device that can satisfy the real-time restrictions in a transitional period where the processing time starts increasing.

Solution to Problem

The calculation device of the present invention predicts a time required for calculation and executes the calculation by adjusting the calculation based on the prediction results within the real-time restrictions.

More specifically, the calculation device predicts a processing time of a calculation related to the amount and property of input data based on a prediction model.

The calculation device adjusts the processing time by decreasing the amount of data used for the calculation or decreasing the number of iterative calculations when the processing time exceeds a time slice allocated to the calculation.

The calculation device executes the calculation within the real-time restrictions by executing the adjusted calculation.

The calculation device may frequently update the prediction model used for predicting the processing time according to the result of the calculation which is executed in a period where the calculation is not performed while changing the amount of data or the number of iterative calculations or using an approximation.

Advantageous Effects of Invention

Since the amount of data and the number of iterative calculations are decreased based on the predicted processing time of calculation according to a time slice allocated to the calculation, it is possible to execute calculations while satisfying the real-time restrictions in a transitional period where the processing time starts increasing.

BRIEF DESCRIPTION OF DRAWINGS

FIG. 6 is a diagram illustrating the structure of task data according to the first embodiment.

FIG. 7 is a diagram illustrating the structure of processing time prediction model data according to the first embodiment.

FIG. 8 is a diagram illustrating the structure of convergence number prediction model data according to the first embodiment.

FIG. 11 is a diagram illustrating the structure of an output stream according to the first embodiment.

FIG. 12 is a diagram illustrating the structure of monitoring data according to the first embodiment.

FIG. 28 is a diagram illustrating the structure of system configuration data according to the second embodiment.

FIG. 29 is a diagram illustrating the structure of an input stream according to the second embodiment.

FIG. 30 is a diagram illustrating the structure of an output stream according to the second embodiment.

DESCRIPTION OF EMBODIMENTS

Figure 1:
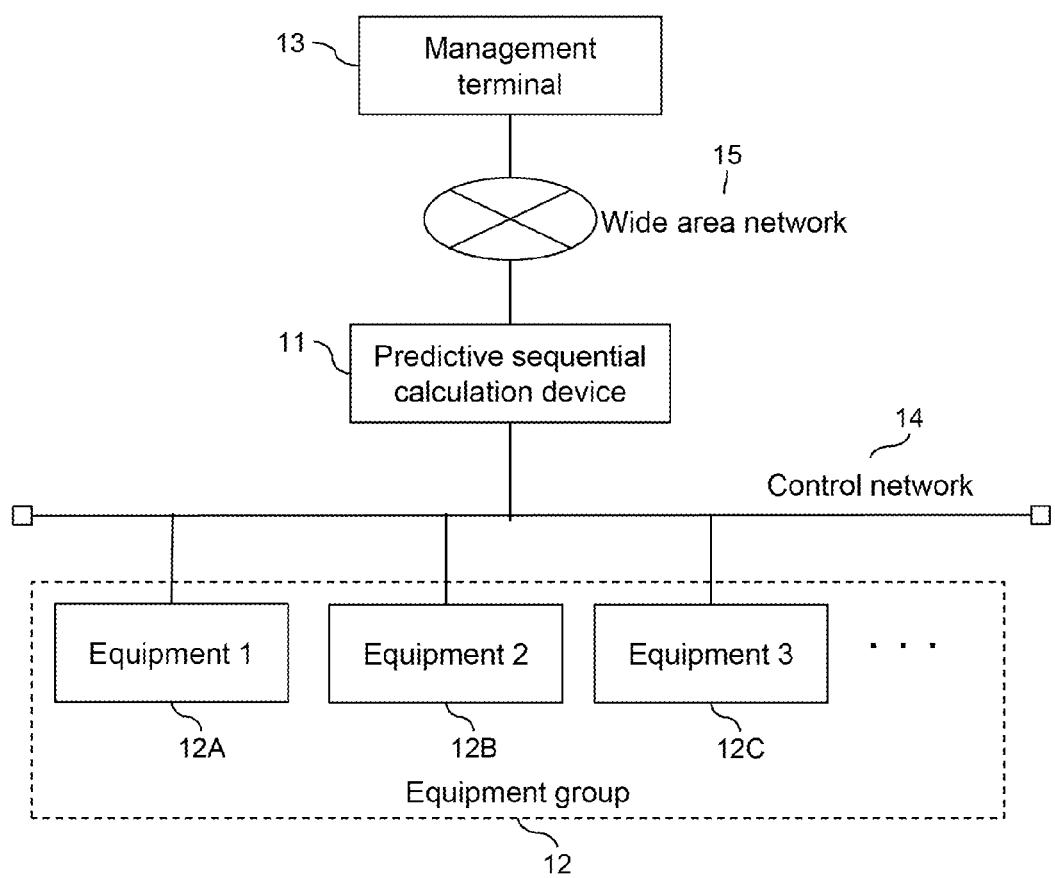
FIG. 1 is a block diagram of a system according to a first embodiment.

Hereinafter, typical embodiments of the present invention will be appropriately described with reference to the drawings. In these drawings, basically, the same components will be denoted by the same reference numerals. Moreover, when components are repeatedly used by being denoted by the same reference numerals, redundant description thereof will not be provided.

[First Embodiment]

A first embodiment will be described. In the first embodiment, a processing performance analysis system that statistically analyzes processing performance of production and inspection equipments and the like will be described as an example.

<System Configuration>

A system configuration of the present embodiment will be described with reference to FIG. 1. As illustrated in FIG. 1, a processing performance analysis system includes a predictive sequential calculation device 11, an equipment group 12, and a management terminal 13. The equipment group 12 includes a plurality of equipments including equipment 1 (12A), equipment 2 (12B), and equipment 3 (12C). In the present embodiment, although one equipment processes a single step, one equipment may process a plurality of steps. Moreover, in the present embodiment, although one predictive sequential calculation device 11 and one management terminal 13 are included, two or more predictive sequential calculation devices and management terminals may be included. For example, when a number of predictive sequential calculation devices 11 are included, the equipment group 12 may be divided into several groups so that the respective groups perform calculation. Alternatively, the several predictive sequential calculation devices 11 after the second may stand by and operate in collaboration according to the occurrence of failure or an increase in the amount of data. The respective components of the predictive sequential calculation device 11 and the equipment group 12 are connected via a control network 14 established by the Ethernet (registered trademark) or the like. Moreover, the predictive sequential calculation device 11 and the management terminal 13 are connected via a wide area network 15 established by the Ethernet or the like.

<Outline of Operation>

Next, the flow of a basic process of the present embodiment will be described briefly. First, an outline of the flow from registration to start of execution of a calculation process (in the present embodiment, this process will be referred to as a task) will be described. Prior to task execution, the management terminal 13 transmits a query, in which analysis contents, real-time restrictions (an execution cycle and a smallest time slice), and the like are described, to the predictive sequential calculation device 11 via the wide area network 15.

In the present embodiment, the task involves estimating processing performance of an equipment (specifically, calculating parameters (a mixing ratio, and mean and variance of distributions) when processing time of respective equipments is applied to a mixed normal distribution. The predictive sequential calculation device 11 analyzes the received query, determines whether the query is executable, and if executable, generates and registers a task corresponding to the query. In the present embodiment, it is assumed that different tasks are registered for respective equipments. The predictive sequential calculation device 11 allocates a time slice equal to or larger than the smallest time slice defined by the query to the registered task so that the registered task is periodically executed. Since data is not transmitted from the respective equipments of the equipment group 12 at the point in time when execution starts, the process ends immediately.

Next, an outline of the flow of task execution will be described. The respective equipments of the equipment group frequently transmit the measured values of the processing time required for the step performed by the equipment to the predictive sequential calculation device 11 via the control network 14. When the time to execute a task arrives, the predictive sequential calculation device 11 first predicts the processing time required for executing the task using a prediction model based on the data transmitted by that time as input data of the task. As a result, the task is executed if the predicted processing time is equal to or less than the time slice allocated to the task. If the predicted processing time is larger than the time slice, a process (1) of increasing the time slice and a process (2) of thinning out the input of the task or the processing content are performed so that the predicted processing time is equal to or less than the time slice. Then, the task is executed and parameters (parameters when the processing time is applied to a mixed normal distribution) indicating the processing performance of the equipment are calculated.

This result is transmitted to the respective equipments of the equipment group 12 or an equipment that controls a plurality of equipments as output data. As a result, the respective equipments of the equipment group 12 can perform optimum control by utilizing the received processing performance parameters.

Next, an outline of the flow of a prediction model updating process will be described. In a period where the task is not executed, calculation of increasing and decreasing the amount of input data or the number of iterations of a series of steps of an EM algorithm or the like is executed. Moreover, the prediction model is updated based on the time taken to execute the calculation. That is, the parameters of a statistic model that receives the amount of data and the number of iterative calculations as its input and outputs processing time are learned. As a result, it is possible to predict the processing time correctly even if the property of a model changes and the amount of data increases when the number of equipments increases or a data transmission cycle decreases.

<Functional Configuration>

Figure 2:
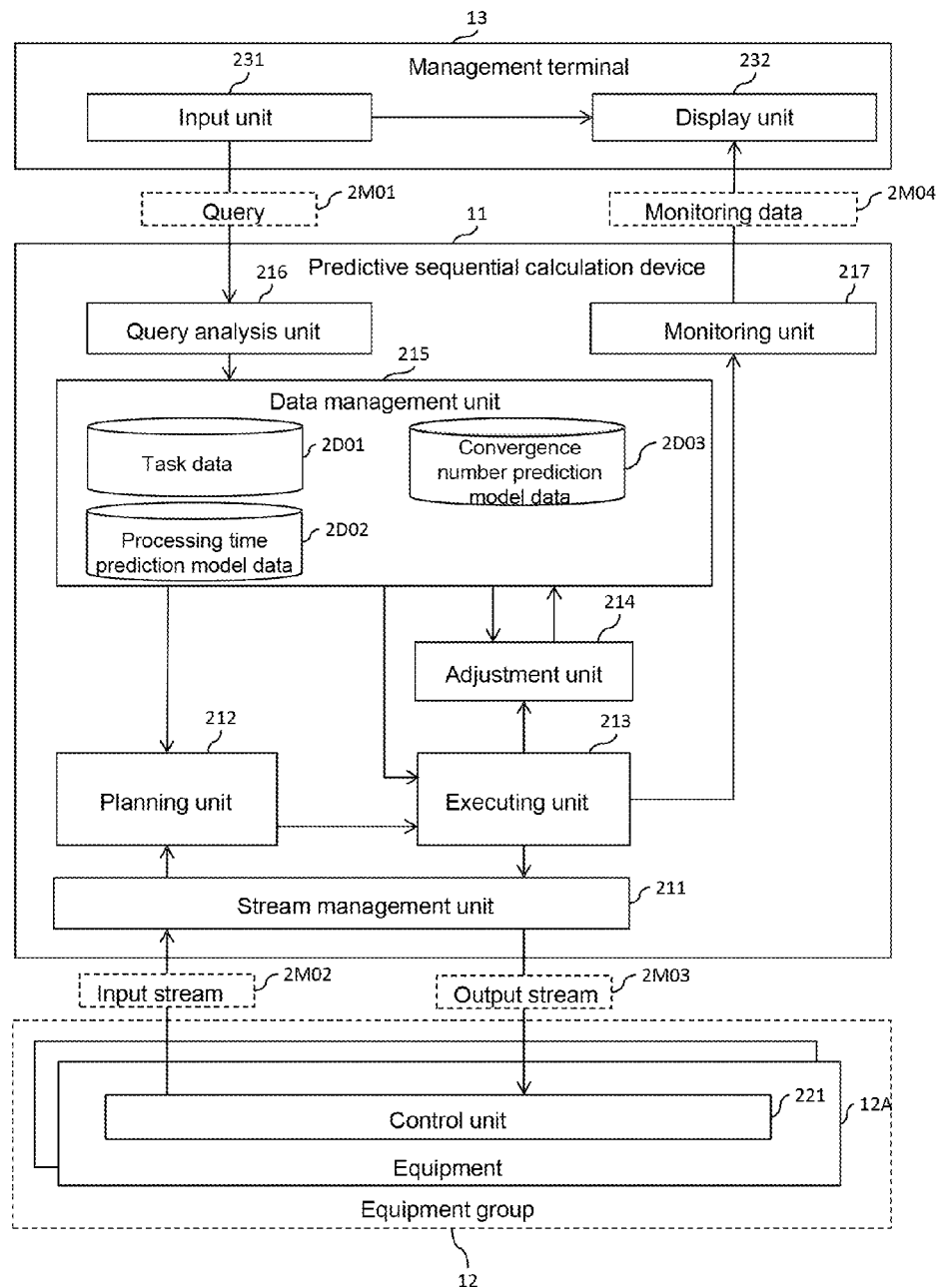
FIG. 2 is an explanatory diagram of a functional configuration according to the first embodiment.
Figure 3:
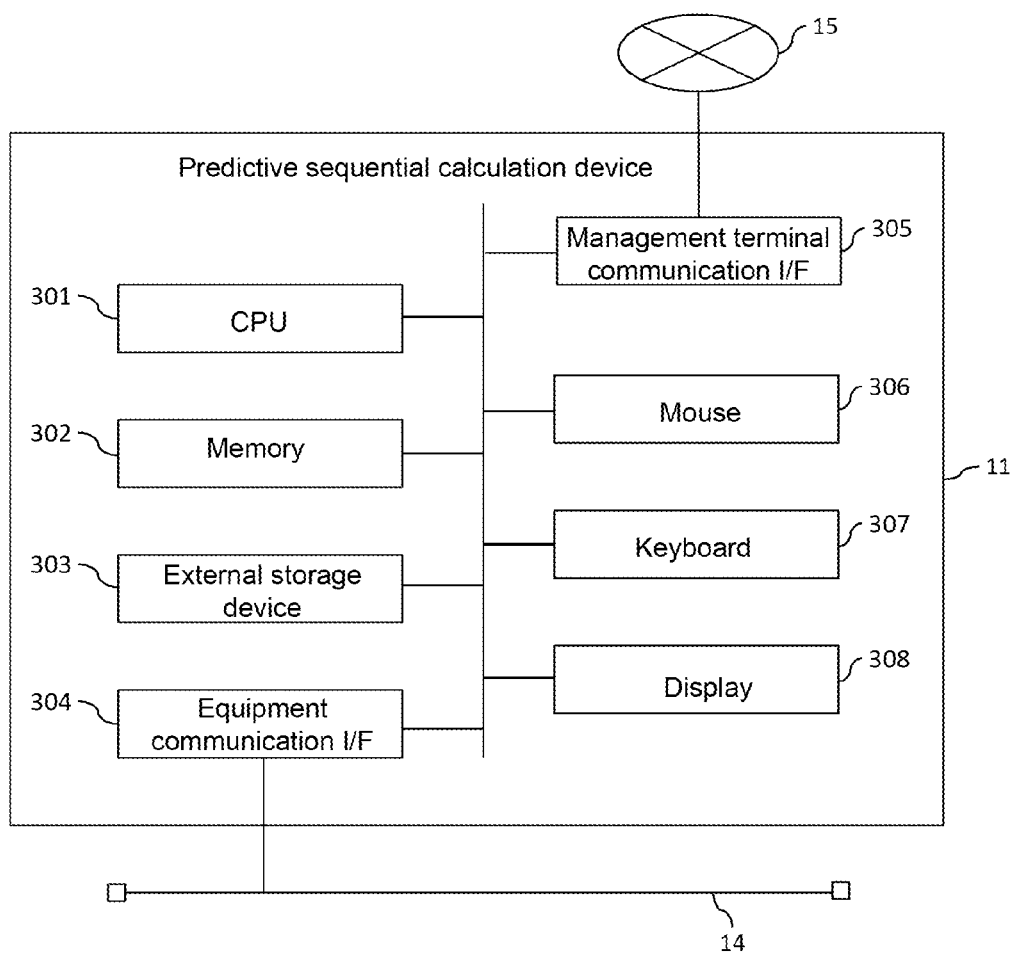
FIG. 3 is an explanatory diagram of hardware components of a predictive sequential calculation device according to the first embodiment.
Figure 4:
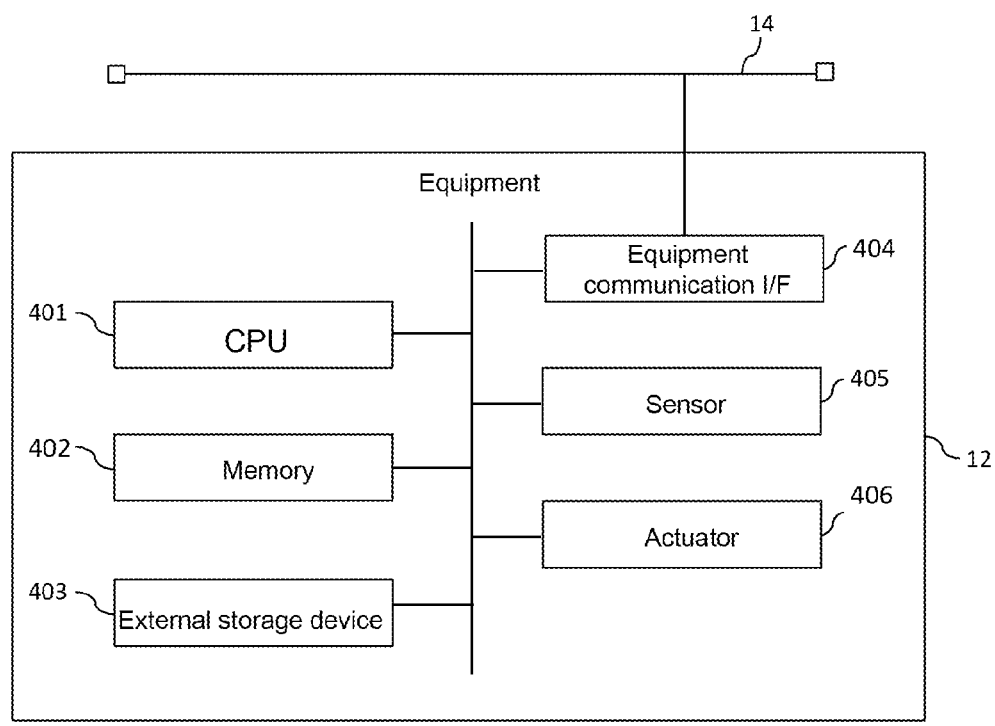
FIG. 4 is an explanatory diagram of hardware components of an equipment according to the first embodiment.
Figure 5:
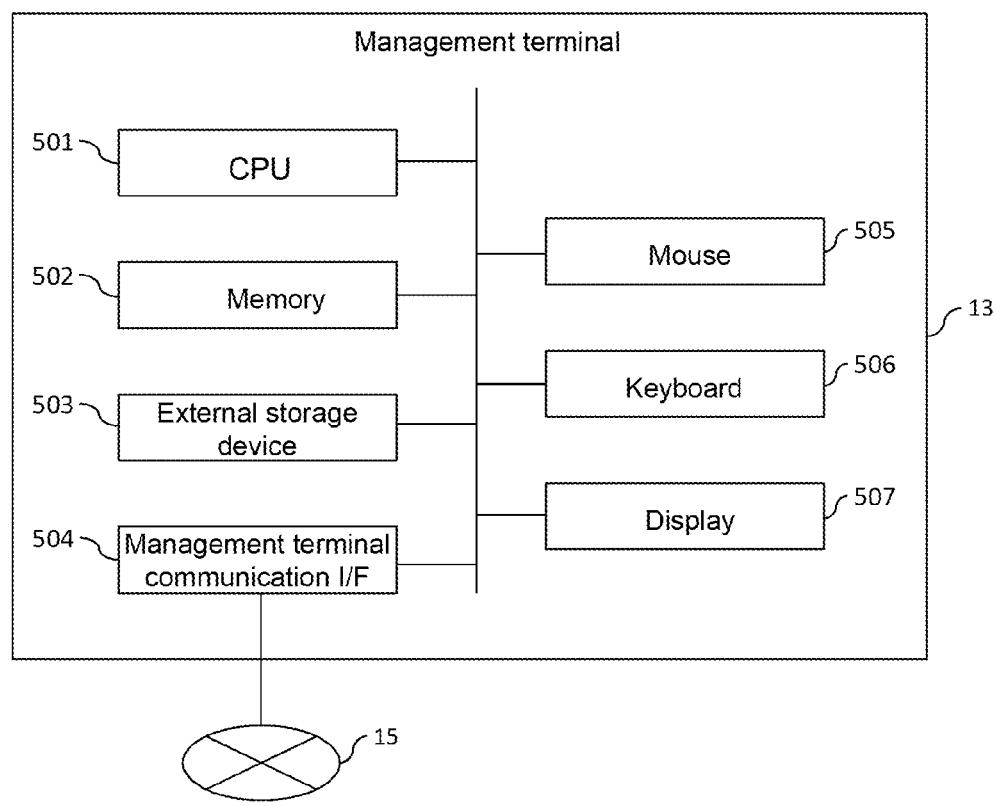
FIG. 5 is an explanatory diagram of hardware components of a management terminal according to the first embodiment.

A functional configuration will be described with reference to FIG. 2. The predictive sequential calculation device 11 includes a stream management unit 211, a planning unit 212, an executing unit 213, an adjustment unit 214, a data management unit 215, a query analysis unit 216, and a monitoring unit 217. The respective equipments of the equipment group 12 include a control unit 221. The management terminal 13 includes an input unit 231 and a display unit 232.

<Function and Hardware>

Next, the correspondence between the functions and hardware components will be described with reference to FIGS. 2, 3, 4, and 5.

The stream management unit 211, the planning unit 212, the executing unit 213, the adjustment unit 214, the data management unit 215, the query analysis unit 216, and the monitoring unit 217, which configure the predictive sequential calculation device 11, are realized when a central processing unit (CPU) 301 reads programs stored in a memory 302 or an external storage device 303 into a read access memory (RAM) area of the memory 302 and controls an equipment communication interface (I/F) 304 connected to the control network 14, a management terminal communication I/F 305 connected to the wide area network 15, a mouse 306, a keyboard 307, and a display 308.

The control unit 221 of each equipment of the equipment group 11 is realized when a CPU 401 reads the programs stored in a memory 402 or an external storage device 403 into a RAM area of the memory 402 and controls an equipment communication I/F 404 connected to the control network 14, a sensor 405 corresponding to the processing content of each equipment, and an actuator 406.

The input unit 231 and the display unit 232 of the management terminal 13 are realized when a CPU 501 reads the programs stored in a memory 502 or an external storage device 503 into a RAM area of the memory 502 and controls a management terminal communication I/F 504 connected to the wide area network 15, a mouse 505, a keyboard 506, and a display 507.

<Data Structure>

Task data 2D01 managed by the data management unit 215 will be described with reference to FIG. 6. The task data 2D01 indicates tasks generated from a quantization parameter that is transmitted from a management terminal. The task data 2D01 includes a task ID 2D011 for identifying tasks, a task execution binary 2D012, a static priority 2D013 used for determining an execution order of tasks and allocation of an additional time slice, a dynamic priority 2D014, and a priority 2D015. Here, the task ID 2D011 is allocated by the data management unit at the point in time when a task is generated from a query and is registered in the data management unit 215. Moreover, the dynamic priority 2D014 is set to an initial value (10) when it is generated and is changed according to the procedure described later. The priority 2D015 is changed with a change in the dynamic priority 2D014.

A prediction model that predicts the processing time of a task and prediction model data 2D02 managed by the data management unit 215 will be described with reference to FIG. 7 and Expression 1.

[Expression 1]

$$(\text{prediction processing time}) = f(x_1, x_2) = \sum_{k=0}^{N} a_k \phi_k(x_1, x_2) \quad [\text{Expression 1}]$$

In the present embodiment, task prediction is performed based on a linear regression model of a basis function that receives an amount x1 indicating the scale of input data and an amount x2 indicating the scale of the number of iterative calculations in calculation of an EM algorithm or the like as its input, as illustrated in Expression 1. Here, "ak" (k is 0, 1, . . . , and N) in Expression 1 is a parameter indicating the weight of each basis function. The prediction model data 2D02 indicates a basis function and parameters of each task and includes a task ID 2D021, a processing time prediction model ID 2D022 for identifying a basis function, a processing time prediction basis function 2D023 indicating the binary of the basis function, and a processing time prediction parameter 2D024 indicating the weight of the basis function. For example, when prediction is performed based on a quadratic polynomial for x1 and x2, the basis function is expressed as Expression 6. Binary data of a program for calculating the basis function is registered in the processing time prediction basis function 2D023.

[Expression 6]

$$\{1, x_1, x_2, x_1, x_2, x_1^2, x_2^2, x_1^2 x_2, x_1 x_2^2, x_1^2, x_2^2\}$$

In the present embodiment, although the processing time is predicted using a linear regression model, other models may be used. Moreover, although an example in which the basis function receives two inputs has been illustrated, either one of them may be received in a case where there is no dependency on the data amount or there is no iterative calculation.

A convergence number prediction model used when determining the number of iterative calculations and convergence number prediction model data 2D03 managed by the data management unit 215 will be described with reference to FIG. 8 and Expression 2.

As described above, when the time slice allocated to the predicted processing time is not sufficient, data or calculation is thinned out. Here, thinning out is a process of decreasing the amount of input data and a process of decreasing the number of iterative calculations. If both processes are performed, the calculation accuracy may deteriorate. Moreover, if only one of the input data amount and the number of iterative calculations is decreased too much, the accuracy may deteriorate too much. In contrast, in the present embodiment, a largest amount of data within a convergence range is used as will be described in detail later. In order to realize this process, in the present embodiment, as indicated in Expression 2, the number of convergences is predicted using a linear regression model of a basis function that receives the scale x1 of the input data as its input.

[Expression 2]

$$\text{(convergence number)} = g(x_1) = \sum_{k=0}^{N} b_k \phi_k(x_1)$$

Here, "bk" (k is 0, 1, . . . , and N) in Expression 1 is a parameter indicating the weight of each basis function. The convergence number prediction model data 2D03 includes a task ID 2D031, a convergence number prediction model ID 2D032, a convergence number prediction basis function 2D033, a convergence number prediction parameter 2D034. For example, when prediction is performed based on a quadratic polynomial for x1, the basis function is expressed as Expression 7. Binary data of a program for calculating the basis function is registered in the processing time prediction basis function 2D023.

[Expression 7]

$$\{1, x_1, x_1^2\}$$

In the present embodiment, although the processing time is predicted using a linear regression model, other models may be used. For example, when a variation in the past is also taken into consideration, an auto-regression model may be used.

Figure 9:
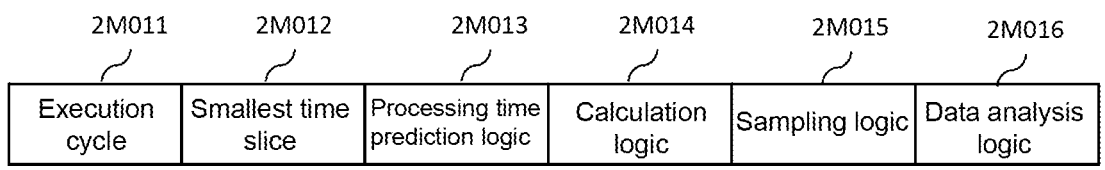
FIG. 9 is a diagram illustrating the structure of a query according to the first embodiment.

The query 2M01 will be described with reference to FIG. 9. The query 2M01 is data such as calculation contents, real-time restrictions, and the like transmitted from the management terminal 13 to the predictive sequential calculation device 11. The query 2M01 includes an execution cycle 2M011, a smallest time slice 2M012, a processing time prediction logic 2M013, a calculation logic 2M014, a sampling logic 2M015, and a data analysis logic 2M016. Here, the smallest time slice is information indicating the lower limit of the time slice allocated to each execution cycle 2M011 required by the query. When a time slice additionally allocated by the predictive sequential calculation device 11 is present, a time slice obtained by adding the additional time slice to the smallest time slice is the period taken until completion of a process in a certain execution cycle. As will be described later, when the pending process is completed within the execution cycle, the allocated period is used for other purposes.

For example, when the execution cycle is 10000 ms and at least 500 ms is allocated to a time slice, 10000 is set to the execution cycle 2M011 and 500 is set to the smallest time slice 2M012. Specifically, the processing time prediction logic 2M015 is data indicating a basis function that is set to the processing time prediction model data 2D02. The execution cycle 2M011 is a multiple of a cycle defined later. Moreover, if a parameter of high prediction accuracy is already known, the parameter may be assigned as an initial value and may be updated as necessary. The calculation logic 2M014 is a process of converting input data to output data, and in the present embodiment, is a process of calculating parameters (a mixing ratio, and mean and variance of distributions) when processing time of respective equipments is applied to a mixed normal distribution. It is assumed that a logic for determining a convergence is incorporated into this logic. For example, when the processing time is applied to an EM algorithm, a condition that the result is smaller than 0.01 of the log-likelihoods after n-th iterative calculation and (n−1)th iterative calculation is incorporated. The sampling logic 2M015 is data indicating a logic for extracting M items of data from N items of data, and for example, is a logic for taking M items by sampling with replacement or a logic for taking M items from a latest group. This logic is configured to be usable when M is larger than N as well as when M is smaller than N. Although this is an example of the query according to the present embodiment, the cycle, the time slice, and the logic can naturally be freely changed according to a calculation content. The data analysis logic 2M016 analyzes the number and the size of input streams to calculate the amount of data.

Figure 10:
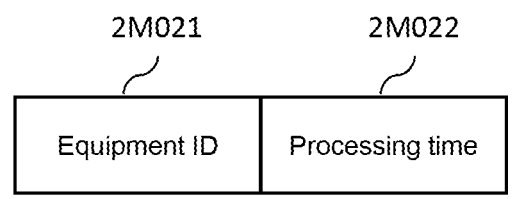
FIG. 10 is a diagram illustrating the structure of an input stream according to the first embodiment.

The input stream 2M02 will be described with reference to FIG. 10. The input stream 2M02 is input data of the task, transmitted from the respective equipments of the equipment group 12 to the predictive sequential calculation device 11 and includes an equipment ID 2M021 and processing time 2M022. For example, if 37 seconds is taken for equipment 1 to process an object, data {Equipment 1, 37} is transmitted.

The output stream 2M03 will be described with reference to FIG. 11. The output stream 2M03 is output data of the task, transmitted from the predictive sequential calculation device 11 to the respective equipments of the equipment group 12, and includes an equipment ID 2M031, a cluster ID 2M032, a mixing ratio 2M033, a mean 2M034, and a variance 2M035. For example, when the processing time for equipment 2 to process a step is applied to a mixed normal distribution that has three normal distributions, a data group including {Equipment 2, Clusters 0, 0.2, 24.1, 13.9}, {Equipment 2, Clusters 1, 0.5, 31.3, 19.2}, and {Equipment 2, Cluster 2, 0.3, 44.2, 20.2} is transmitted.

The monitoring data 2M04 will be described with reference to FIG. 12. The monitoring data 2M04 is data indicating a task execution state transmitted from the predictive sequential calculation device 11 to the management terminal 13, and includes a task ID 2M041, an execution time 2M042, an input data amount 2M043, a thin-out number 2M044, and an additional allocation time 2M045.

<Process Flow>

Figure 13:
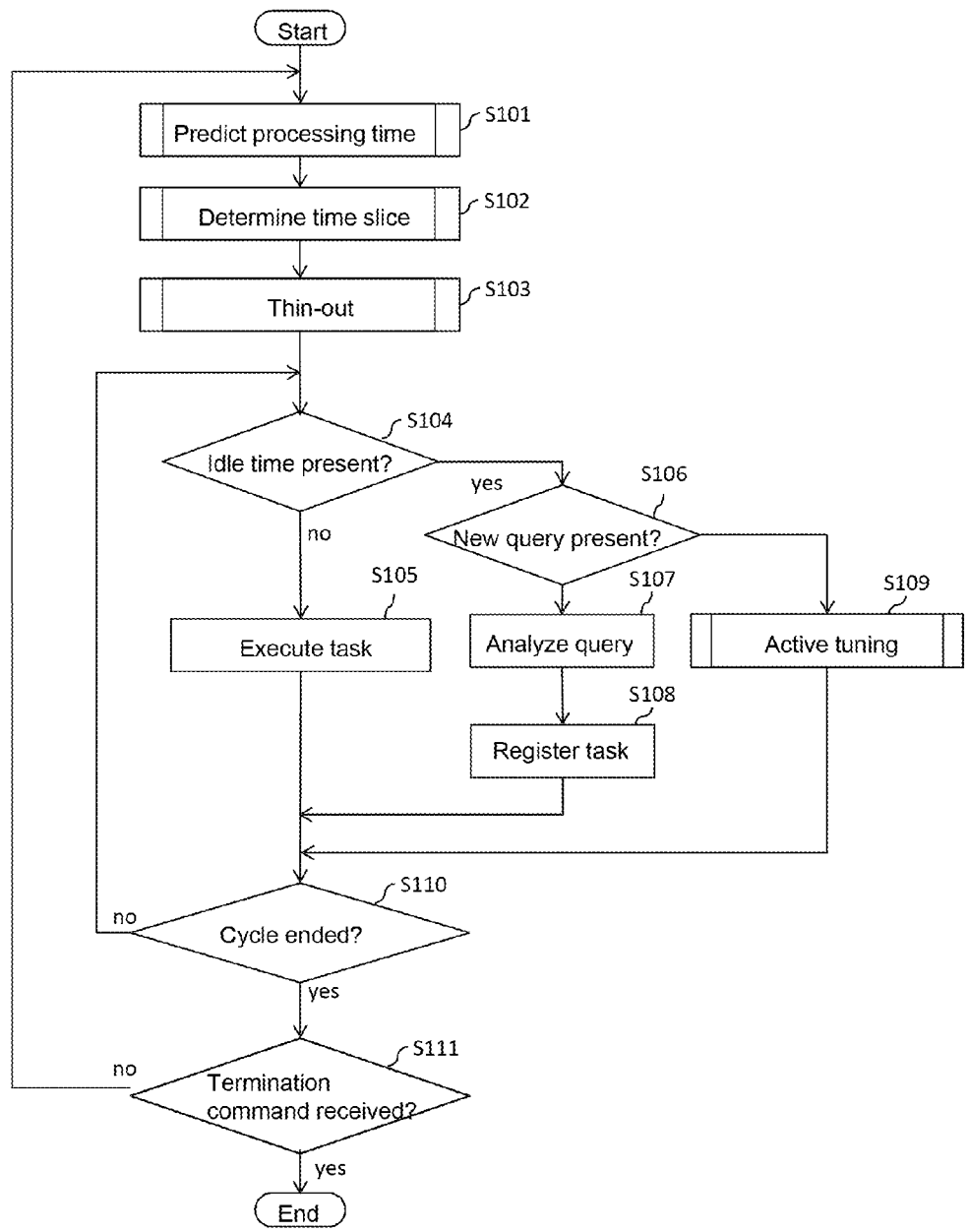
FIG. 13 is a flowchart illustrating an entire process according to the first embodiment.

An outline of the process of the predictive sequential calculation device 11 will be described with reference to FIG. 13. The predictive sequential calculation device 11 starts various processes when an interrupt of a cyclic timer occurs (for example, every 100 ms). Here, in the present embodiment, the period from an interrupt at a certain point in time to an interrupt at the next point in time will be referred to as a cycle. In description of the outline of the process, it is assumed that the predictive sequential calculation device 11 has already received a query from the management terminal 13 and has registered a task. Hereinafter, the process immediately after the interrupt of a cyclic timer occurs will be described.

First, the planning unit 212 of the predictive sequential calculation device 11 acquires an input stream 2M02 for a task that is received from the respective equipments of the equipment group 12 and starts to be executed from the present cycle, from the stream management unit 211. The predicted processing time of the task is calculated based on the acquired input stream and the processing time prediction model data 2D02 (step S101).

Subsequently, the planning unit 212 of the predictive sequential calculation device 11 allocates required for the query to the task that starts to be executed from the present cycle. It is checked whether the predicted processing time exceeds the allocated time slice. If the predicted processing time exceeds the time slice, an additional time slice is allocated based on the priority of the task (step S102).

Subsequently, the planning unit 212 of the predictive sequential calculation device 11 checks again whether the predicted processing time of the task exceeds the allocated time slice. If the predicted processing time exceeds the time slice, on the basis of prediction model data 2D02 the amount of the input stream 2M02 of the task and the number of iterative calculations are decreased so that a largest amount of data within a convergence range can be used (step S103).

Subsequently, the executing unit 213 of the predictive sequential calculation device 11 checks whether a task that is to be executed at the present time is present (that is, whether an idle time is present). If a task to be executed is present, the flow proceeds to step S105. If such a task is not present, the flow proceeds to step S106 (step S104).

When it is determined in step S104 that a task to be executed is present, the executing unit 213 of the predictive sequential calculation device 11 sets a one-shot timer so that an interrupt occurs the time slice of the task earlier and executes the task. As a result, after the allocated time slice has elapsed, the task is deprived of an execution right, and the flow proceeds to step S110. The input stream is stored immediately before the flow proceeds to the next step because the input stream is required in the subsequent step (step S109). Moreover, an execution state is transmitted to the monitoring unit 217 (step S105).

When it is determined in step S104 that a task to be executed is not present, the planning unit 212 of the predictive sequential calculation device 11 sets a one-shot timer so that an interrupt occurs an idle time earlier. It is checked whether a new query has arrived in the query analysis unit 216. If a new query is present, the flow proceeds to step S107. If a new query is not present, the flow proceeds to step S109 (step S106).

When it is determined in step S106 that a new query is present, the query analysis unit 216 of the predictive sequential calculation device 11 analyzes the query to check whether the query has a prescribed format, a smallest time slice can be allocated without any collision with an already-registered task, and the sum of smallest time slices is a prescribed value (for example, equal to or less than 500 ms) (step S107).

Subsequently, the data management unit 215 of the predictive sequential calculation device 11 generates and registers new task data 2D01 from the query having passed through all checkings, and the flow proceeds to step S110 (step S108).

When it is determined in step S106 that a new query is not present, the adjustment unit 214 of the predictive sequential calculation device 11 selects one task based on the priorities of tasks. A task (referred to as a tuning task) in which data obtained by increasing and decreasing the amount of past data is received as an input and the number of iterative calculations is changed is executed. Further, model data such as processing time and the number of convergences is updated, the dynamic priority and the priority are calculated based on a prediction error, the respective items of data managed by the data management unit 215 are updated, and the flow proceeds to step S110 (step S109).

When a timer interrupt occurs during the process of steps S107, S108, and S109, the process is stopped immediately, and then, the flow proceeds to step S110. Similarly, when stopped processes are present, these processes are restored, and the processes are continued.

Subsequently, when an interrupt of a cyclic timer is not detected, the executing unit 213 of the predictive sequential calculation device 11 performs the process of step S104. If the interrupt is detected, processing is resumed from step S111 (step S110).

When the interrupt of a cyclic timer is detected in step S110, the executing unit 213 of the predictive sequential calculation device 11 checks whether a termination command from an input device such as a keyboard is detected. If the termination command is detected, the present flow ends. If the termination command is not detected, the flow returns to step S101 (step S111).

In the above description, although the idle time is used for processing queries and active tuning, the idle time may be used in order to execute a task to which other real-time restrictions are not applied.

Figure 14:
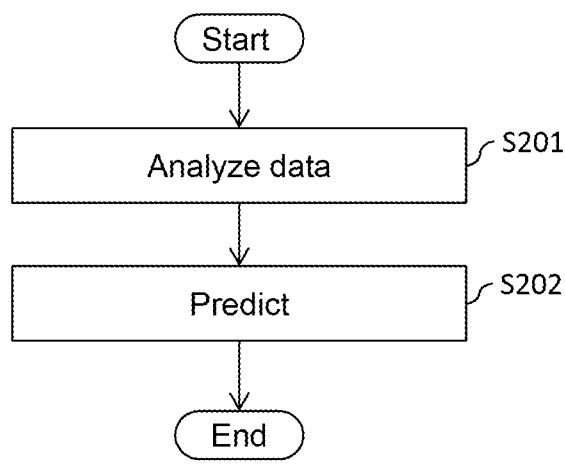
FIG. 14 is a flowchart illustrating a processing time prediction process according to the first embodiment.

The flow of a processing time prediction process (step S101) will be described in detail with reference to FIG. 14. As described above, since one task corresponds to one equipment, the planning unit 212 of the predictive sequential calculation device 11 first classifies the data of the input stream 2M02 for the respective equipments. The number of items of input streams for each equipment is calculated. In the present embodiment, although the amount of data is used as the number of items of input streams, when the input stream is data of a variable length, for example, preprocessing may be performed in such a way that the input stream is decomposed into smaller units or is parsed. Moreover, when the processing time depends greatly on the actual data size rather than the number of items of data, the data size only may be calculated rather than calculating the number of items of data (step S201).

Subsequently, the planning unit 212 of the predictive sequential calculation device 11 predicts the processing time as the sum (that is, weighted linear sum) of the products between the basis function and the parameters defined in the processing time prediction model data 2D02 using the number of items of data calculated in the previous step as an input, and the present process flow ends (step S202).

Figure 15:
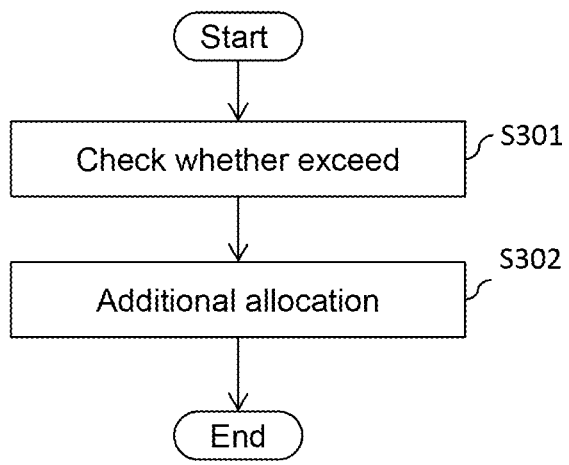
FIG. 15 is a flowchart illustrating a time slice determining process according to the first embodiment.

The flow of a time slice determining process (step S102) will be described in detail with reference to FIG. 15. Since a task has an execution cycle 2M011 that is N times the cycle as described above, the planning unit 212 of the predictive sequential calculation device 11 allocates a period (N/smallest time slice 2M012) and a period required for preemption to each task as a time slice during one cycle. Subsequently, it is checked whether the time slice allocated to each task exceeds the predicted processing time. That is, a value (difference) obtained by subtracting the time slice from the predicted processing time is calculated, and a task in which the result is negative is extracted (step S301).

Subsequently, an idle time is allocated to the task in which the result is negative as an additional time slice, and the present process flow ends. In this case, when a number of tasks in which the result is negative, the required time slice is sequentially allocated to the tasks in descending order of priorities. When priorities collide, a task of which the deadline (a remaining processing time) is close has a higher priority. A priority determining method will be described later. Another time slice allocation technique (for example, a rate monotonic queue or a priority-based queue) may be used (step S302). Here, how the task of which the deadline (remaining processing time) is close will be extracted is determined based on execution time. That is, the more impending (closer) the next execution time, the closer the deadline of the extracted task.

In the present embodiment, time management for satisfying real-time restrictions is performed in each cycle (for example, the smallest time slice is divided by N). By doing so, it is possible to simplify the processing. If the real-time restrictions can be satisfied in the respective cycles by doing so, the real-time restrictions can be satisfied in an execution cycle which is the sum of the cycles.

Figure 16:
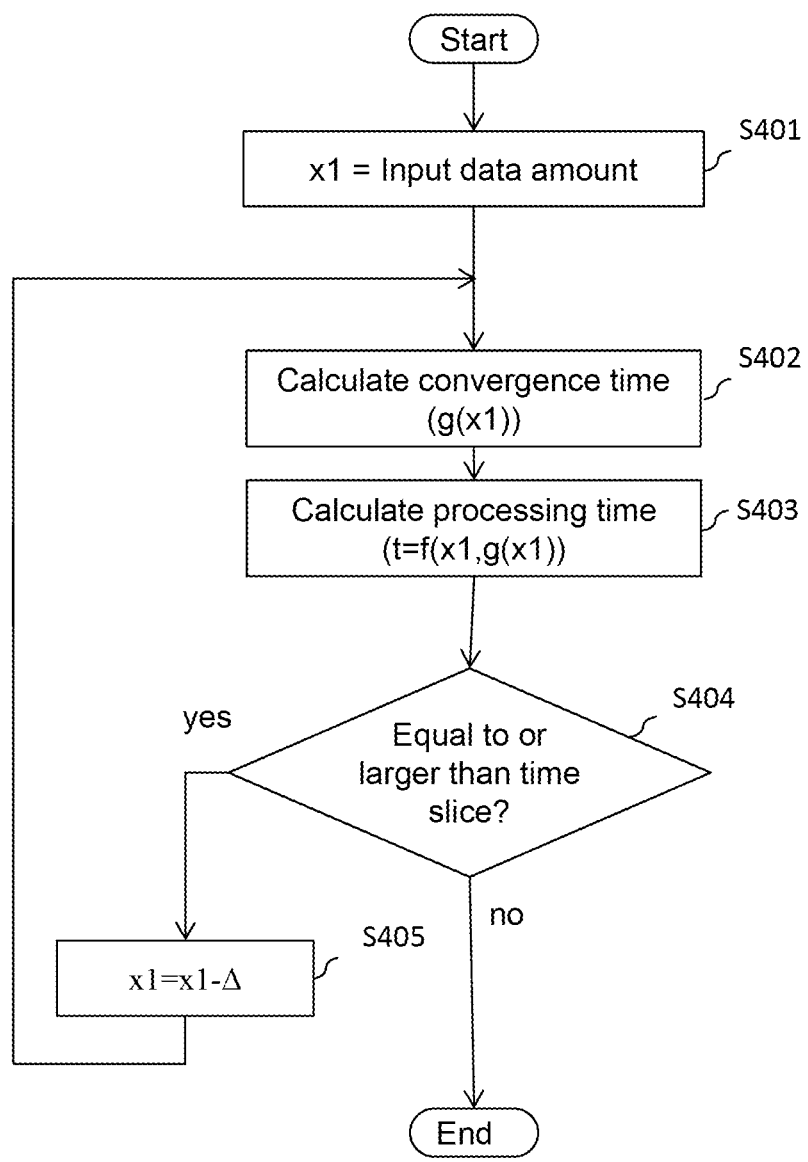
FIG. 16 is a flowchart illustrating a thin-out process according to the first embodiment.

The flow of a thin-out process (step S103) will be described with reference to FIG. 16 and Expression 3.

Figure 19A:
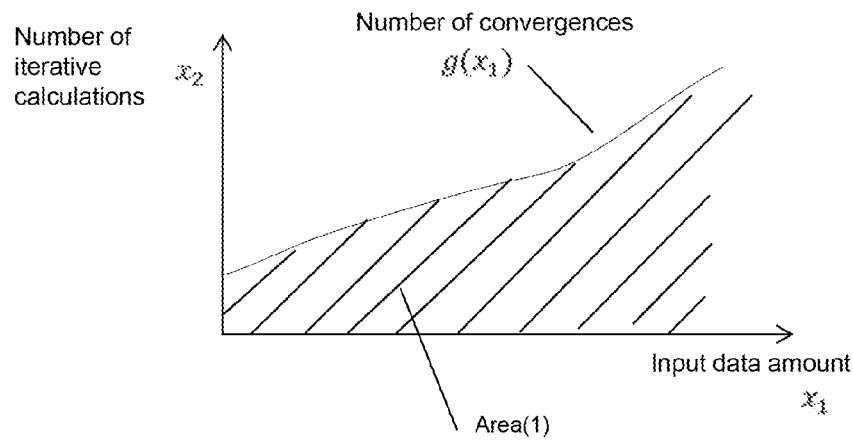
FIG. 19(A) is a diagram illustrating the image of the thin-out process according to the first embodiment (particularly, the relation among input data, number of iterative calculations, and number of convergences).

In the present embodiment, a largest input stream within a range (region (1)) where such a calculation illustrated in FIG. 19(A) (a diagram illustrating a smallest convergence number function) converges is used. Thus, when the time slice determination result shows that a task in which the difference between the predicted processing time and the time slice is negative is still present, the amount of data and the number of iterative calculations that solve the optimization problem as expressed in Expression 3 are used.

[Expression 3]

Maximize $x_1$ [Expression 3]

$$\sum_{k=0}^{M} f(x_1, g(x_1)) < \text{(time slice allocated to the task)}$$

Figure 19B:
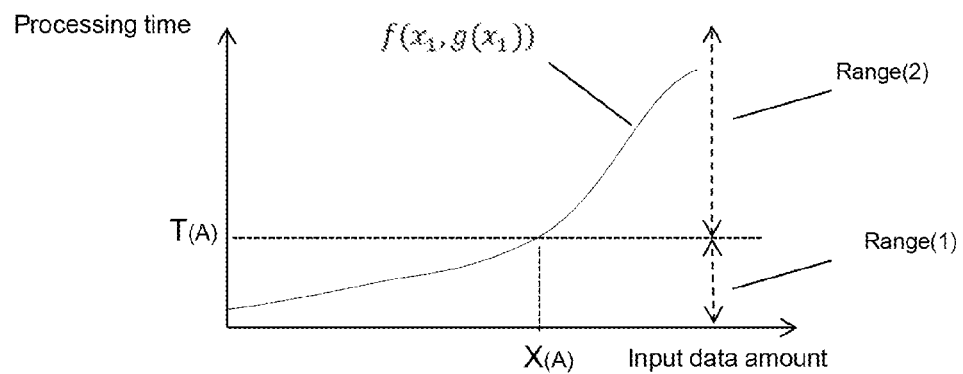
FIG. 19(B) is a diagram illustrating the image of the thin-out process according to the first embodiment (particularly, the relation between input data and processing time).

That is, an intersect between a time slice (T(A)) and g(x1) is selected as illustrated in FIG. 19(B) (a diagram illustrating a function that correlates the number of items of input data, the number of iterative calculations, and convergence time). Here, a time slice or less is a region (range (1)) in which it is possible to satisfy the time restrictions, and a time slice or larger is a region (range (2)) in which it is not possible to satisfy the time restrictions. Here, an axis X(A) representing the input data amount of FIG. 19(B) indicates a largest input stream within a convergence range.

Specifically, the planning unit 212 of the predictive sequential calculation device 11 determines the above based on the following procedure.

First, a data amount is set to a temporal variable x1 that indicates an amount (step S401).

Subsequently, a predicted convergence number (g(x1)) at x1 (that is, the number of iterative calculations that is considered to be required for convergence) is calculated based on the convergence number prediction model data 2D03 (step S402).

Subsequently, the processing time (f(x1,g(x1))) for x1 and g(x1) is calculated based on the processing time prediction model data 2D02 (step S403).

Subsequently, it is checked whether the processing time is equal to or larger than the time slice. If x1 is equal to or larger than the time slice, the flow proceeds to step S405. If x1 is smaller than the time slice, the present process flow ends (step S404).

When it is determined in step S404 that x1 is equal to or larger than the time slice, x1 is decreased by a small value (for example, 1), and the flow returns to step S402 (step S405).

In the present embodiment, an example in which two method of increasing the time slice and thinning out the calculation process are used in order to satisfy the real-time restrictions has been described. However, it is not always necessary to use these two methods, but the advantage of the present invention is obtained by using only one of these methods. For example, when thinning-out is performed without increasing the time slice, step S103 of FIG. 13 may be performed while skipping step S302 after step S301 of FIG. 15 is performed. When the time slice is decreased without performing thinning-out, step S104 may be performed while skipping step S103 after step S102 of FIG. 13 is performed.

Moreover, in the present embodiment, thinning-out is performed so that as much data as possible are utilized as long as convergence determination criteria defined for each task are satisfied. In this case, modeling a smallest convergence determination number for the data amount eventually results in the problem of optimization of one variable (data amount). Due to this, the calculation for determining the additional time slice with the processing time taken into consideration requires only one variable as its input, which simplifies the processing.

Figure 17:
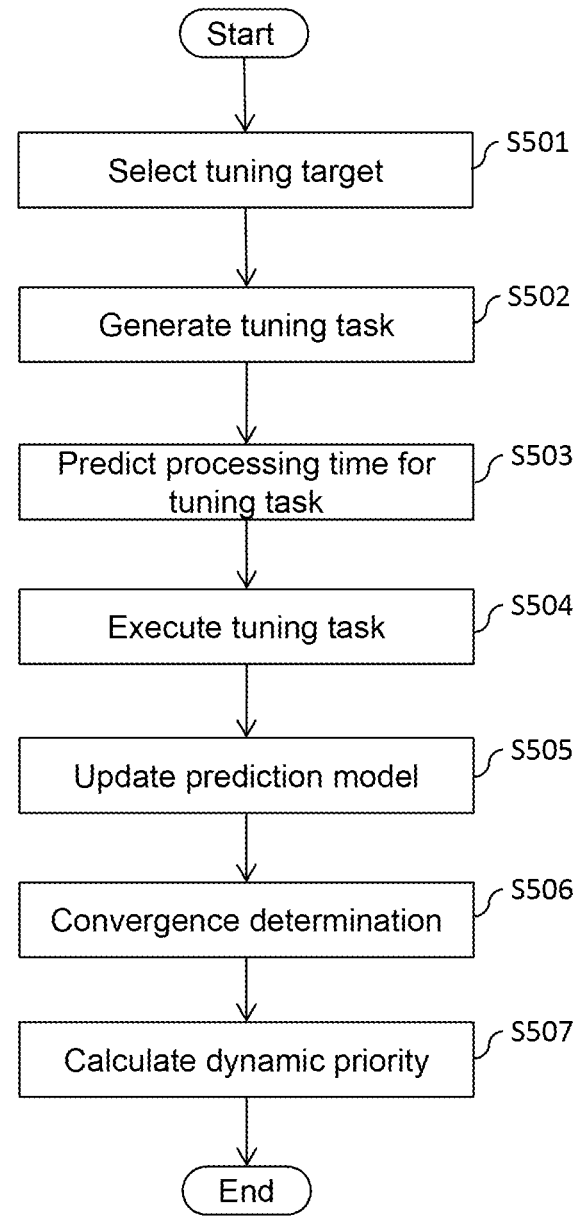
FIG. 17 is a flowchart illustrating an active tuning process according to the first embodiment.

The flow of active tuning (step S109) will be described in detail with reference to FIG. 17 and Expression 4.

First, prior to processing, the adjustment unit 214 of the predictive sequential calculation device 11 manages tasks according to three levels of queues (high, middle, and low-level queues) classified by the priority 2D015. One task at the top of a high-level queue is selected at the point in time when the present process starts (step S501).

Subsequently, the past input stream of the selected task is acquired. The data amount of the past input stream is randomly increased or decreased using the sampling logic 2M015. Further, the number of iterative calculations is also changed randomly. In the present embodiment, although the data amount and the number of iterative calculations are changed randomly, the data amount and the number of iterative calculations may be changed based on a specific distribution (step S502).

Subsequently, the predicted processing time for the data amount and the number of iterative calculations is calculated based on the processing time prediction model data 2D02 (step S503).

Subsequently, a task (tuning task) in which the data amount and the number of iterative calculations are changed is executed. When the task is executed, the number of iterative calculations is stored at the point in time when convergence of the iterative calculation is detected (step S504).

Subsequently, the parameters of Expression 1 are updated based on stochastic gradient descent using the data amount, the number of iterative calculations, and the processing time taken for execution. The updating may use another method (step S505).

Subsequently, if the number of convergences of the iterative calculation is stored in step S504, the parameters of Expression 2 are updated based on stochastic gradient descent using the data amount and the number of convergences. The updating may use another method (step S506).

Subsequently, a dynamic priority is calculated. The dynamic priority in the present embodiment is based on uncertainty of prediction and is defined as Expression 4.

[Expression 4]

(dynamic priority) =min(maximum dynamic priority, floor ($K$(((prediction processing time)−(real processing time))$^2$)))

That is, a square error of the predicted processing time and the actual processing time is constant-multiplied and is subjected to a floor function to obtain an integer value which is calculated as a dynamic priority (of which the upper limit is a largest dynamic priority). Here, in the present embodiment, time is calculated in ms units and K is 0.0001. Moreover, a largest priority is 20. Further, the dynamic priority is added to a static priority determined in advance for each task to calculate a priority. Lastly, updating is implemented according to the dynamic priority and priority used for calculating a corresponding line of the task data 2D01, and the present process flow ends (step S507).

<User Interface>

Figure 18:
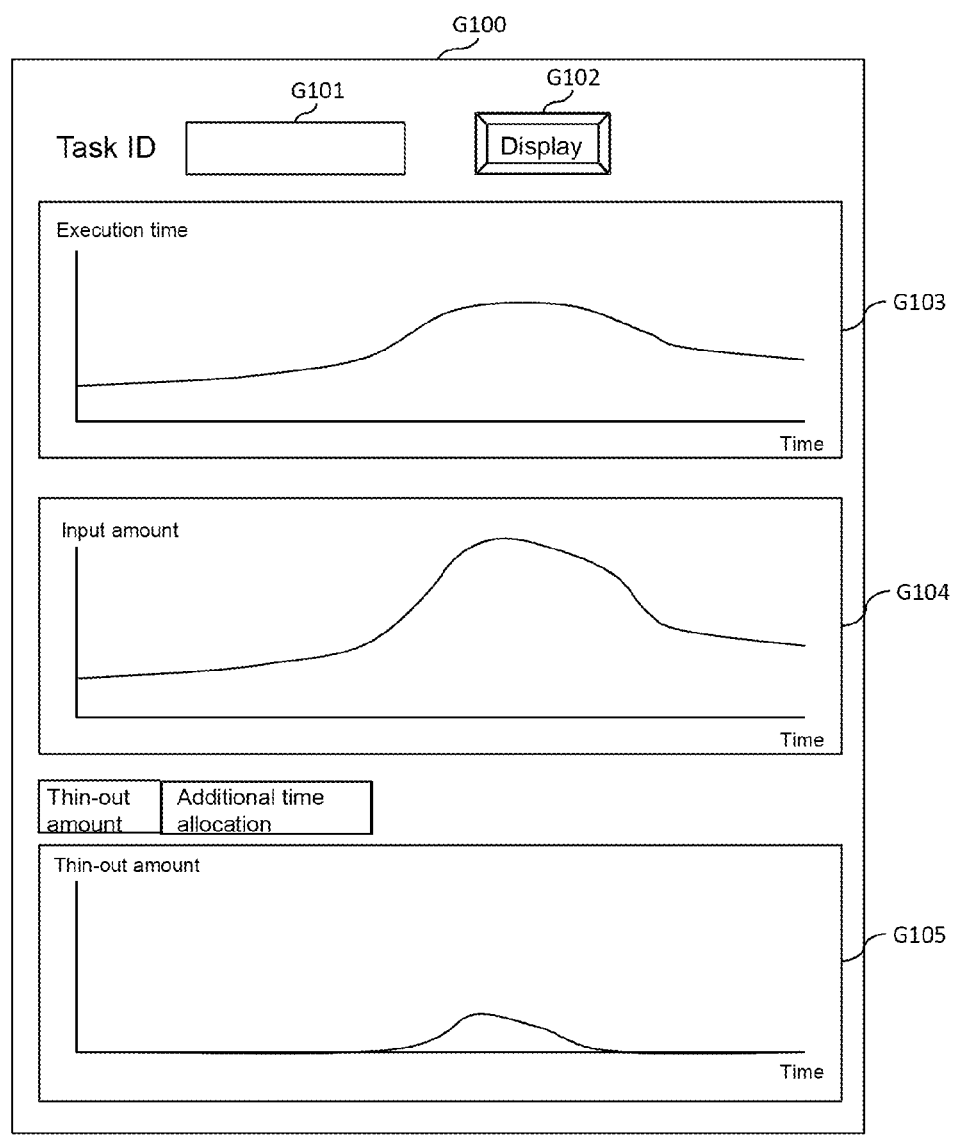
FIG. 18 is a diagram illustrating a monitoring screen according to the first embodiment.

A method of displaying the monitoring result of the management terminal 13 will be described with reference to FIG. 18. It is assumed that the monitoring unit 217 of the predictive sequential calculation device 11 transmits monitoring data 2M04 to the display unit 232 of the management terminal 13 in line with execution of tasks.

A monitoring screen G100 displayed on the display unit 232 of the management terminal 13 includes a task ID input box G101, a display button G102, an execution time display graph G103, an input amount display graph G104, and an adjustment amount display graph G105.

The user can select a task to be displayed by inputting a task ID in the task ID input box G101 and pressing the display button G102 by means of the input unit 231. When the task is selected, the progress of the execution time 2M042 of the monitoring data 2M04 is displayed in the execution time display graph G103, the progress of the input stream amount 2M043 of the monitoring data 2M04 is displayed in the input amount display graph G104, and the thin-out amount 2M044 of the monitoring data 2M04 and the additional allocation time 2M045 of the monitoring data 2M04 are displayed in the adjustment amount display graph G105. The tabs above the adjustment amount display graph G105 enable the user to select whether the thin-out amount or the additional time slice will be displayed. By using this information, the user can review allocated resources and real-time restrictions by monitoring a change in the execution time, a change in the input stream, and a change in the adjustment of thin-out and additional time allocation.

<Supplement of Advantageous Effects>

As described above, according to the present embodiment, the data amount and the number of iterative calculations can be controlled based on a predicted processing time of calculation according to a time slice allocated to the calculation. Thus, it is possible to execute the calculation while satisfying the real-time restrictions in a transitional period where the processing time starts increasing.

Figure 20A:
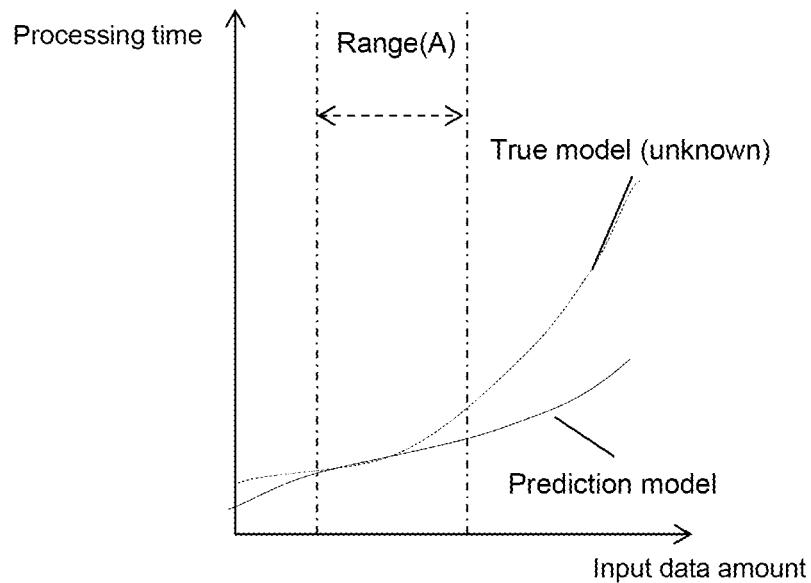
FIG. 20(A) is a diagram illustrating the effect of active tuning according to the first embodiment (a normal input range).
Figure 20B:
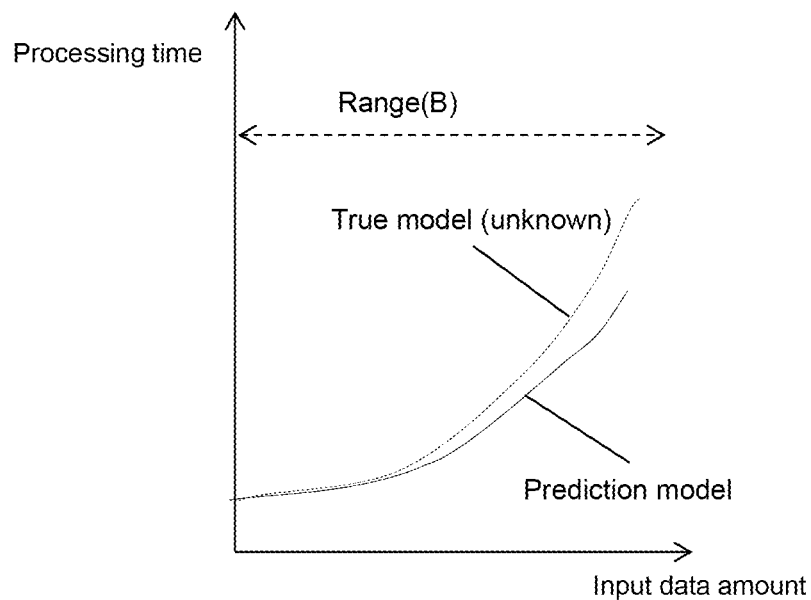
FIG. 20(B) is a diagram illustrating the effect of active tuning according to the first embodiment (an input range of the present embodiment).

Moreover, according to the present embodiment, since the model is updated (actively tuned) using data during execution, it is possible to predict the processing time according to a change in data amount and property after introduction of the model. Moreover, when updating of the model is performed by merely using the data during execution, which is used without any modification, the model exhibits high accuracy in a normal input range (range (A)) as illustrated in FIG. 20(A), and exhibits low accuracy in other ranges. However, according to the present embodiment, since the model is updated using execution results of a task in which the data amount and the number of iterative calculations are changed, the model can be updated for a data amount and the number of iterative calculations that are not obtained in a normal period as illustrated in FIG. 20(B). Thus, it is possible to perform prediction with high accuracy in an emergency where the data amount increases or the data property changes. Here, the range (B) in the drawing indicates an input range of the active tuning in the present embodiment.

Further, according to the present embodiment, the data amount and the number of iterative calculations are decreased so that data is used as much as possible within a range where predetermined calculation convergence criteria are satisfied rather than greatly decreasing one of the data amount and the number of iterative calculations. Thus, it is possible to prevent deterioration of calculation accuracy.

Further, according to the present embodiment, when the data amount and the thin-out amount of the number of iterative calculations are determined, the number of iterative calculations for the data amount is modeled so that a two-variable optimization problem is converted into a one-variable optimization problem. Thus, it is possible to shorten the time required for determining the time slice and to put more time on tasks, active tuning and the like. As a result, it is possible to perform calculation without unnecessarily thinning out tasks and to improve calculation accuracy.

Further, according to the present embodiment, when it is not possible to guarantee the smallest time slice required by the query, the task is not generated or registered, it is possible to prevent the real-time restrictions from being broken unexpectedly when installing more equipments.

Further, according to the present embodiment, since the time slice allocation and thin-out states can be monitored, the user can easily review resource distribution.

<Second Embodiment>

A second embodiment will be described. In the second embodiment, a power energy management system that estimates a power system state will be described as an example.

<System Configuration>

Figure 21:
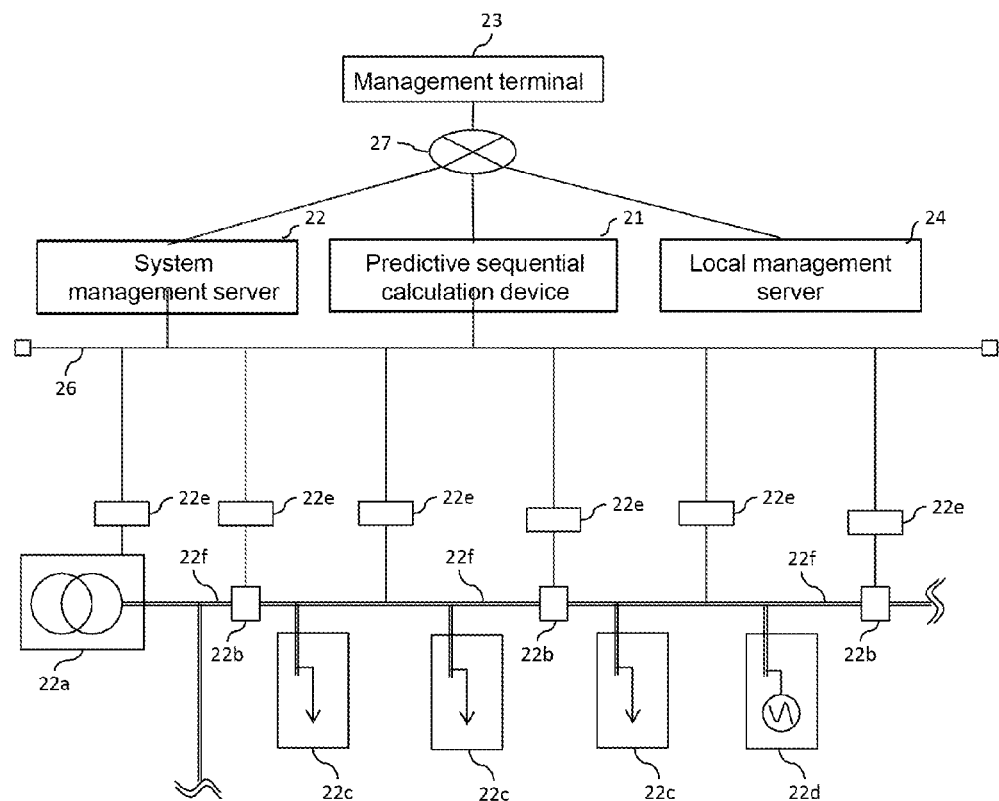
FIG. 21 is a diagram of a system according to a second embodiment.

A system configuration of the present embodiment will be described with reference to FIG. 21. As illustrated in FIG. 21, a power energy management system includes a predictive sequential calculation device 21, a system management server 22, a transformation equipment 22a, a switch 22b, a load equipment 22c, a power generation equipment 22d, a power measurement equipment 22e, a management terminal 23, and a local management server 24. Here, the load equipment 22c means a power transmission equipment for transmitting low-voltage power and demand equipments in buildings or factories, for example. Moreover, the power generation equipment means a power generator in a photovoltaic power generated facility, a factory, a railroad, or the like. The equipment may include a power storage equipment.

The transformation equipment 22a, the switch 22b, the load equipment 22c, and the power generation equipment 22d are connected by a power transmission line 22f. The power measurement equipment 22e is connected via a dedicated line and measures the state of connected equipments. The predictive sequential calculation device 21, the system management server 22, and the power measurement equipment 22e are connected via a control network 26 established by the Ethernet or the like. Moreover, the predictive sequential calculation device 21, the system management server 22, the management terminal 23, and the local management server 24 are connected via a wide area network 27 established by the Ethernet or the like.

The predictive sequential calculation device 21 may be the same as the system management server 22, and a number of predictive sequential calculation device 21 may be included.

<General Description of Second Embodiment>

Next, a basic operation of the power equipment will be described. The power output from the transformation equipment 22a is transmitted to the load equipment 22c via a system including the power transmission line 22f and the switch 22b and is consumed according to the load of the load equipment 22c. Moreover, the power generation equipment 22d transmits power to a system similarly to the transformation equipment 22a. In this case, the system management server 22, the transformation equipment 22a, the switch 22b, and the power generation equipment 22d stabilize the power in collaboration with other power security equipments so that the power does not become unstable.

Next, a basic role of the predictive sequential calculation device 21 in the present embodiment will be described. The predictive sequential calculation device 21 performs state estimation and detects abnormalities and the trend thereof by processing the measurement values of the power measurement equipment 22e and transmits the results to the system management server 22 and the local management server 24. In the present embodiment, in particular, a state estimation process will be described as an example. Here, the state of a system means power, phases, voltages, and the like. This state is measured by the power measurement equipments 22e attached to the transformation equipments 22a and the switches 22b. The measurement values measured by the power measurement equipment 22e may sometimes be incorrect due to errors and abnormalities of a communication network. Moreover, the user may want to know the state of an area where the power measurement equipment 22e is not present. Thus, the most viable state is estimated from the measured states of respective areas. This is referred to as state estimation. As describe later, the state estimation results are used for control of the switch 22b or the like, the real-time restrictions are applied to the state estimation.

Next, the calculation content of state estimation and a thin-out method will be described. The state estimation is generally calculated using all states of a plurality of equipments (referred to as areas). In this case, the states are estimated by performing a process of solving a simultaneous equation of state estimation relating to a circuit obtained from a system and eliminating an outlier called bad data. Thus, the processing time may practically change due to state instability. In general, although the simultaneous equation is derived and solved for an entire area, this may be substituted with a problem of solving simultaneous equations relating to a plurality of smaller circuits by dividing the area into a plurality of sub-areas. This means a decrease in the amount of calculation although the estimation accuracy is reduced proportionately. In the present embodiment, this is used as a thin-out means.

Next, the characteristics of state estimation in the event of abnormalities such as lightning or system failures and assumptions in the present embodiment will be described. For example, state estimation is performed at a cycle of once every 5 seconds. However, if an abnormality occurs, it is requested to perform state estimation at a high frequency of once every one second. Thus, in the present embodiment, it is assumed that a query in which the execution cycle in an area with abnormalities is short and the smallest time slice of the other areas is decreased.

<Outline of Operation>

Next, the flow of a basic process of the present embodiment will be described briefly. First, prior to calculation (in the present embodiment, this is referred to as a task) of state estimation, the flow of generation and registration of tasks will be described. The management terminal 23 transmits a query, in which processing contents, the real-time restrictions, and the like of the state estimation are described, to the predictive sequential calculation device 21 via the wide area network 27. The predictive sequential calculation device 21 analyzes the received query, determines whether the query is executable, and if executable, generates and registers a task corresponding to the query. The predictive sequential calculation device 21 allocates a time slice equal to or larger than the smallest time slice defined by the query to the registered task so that the registered task is periodically executed.

Next, an outline of the flow of task execution will be described. The power measurement equipment 22e frequently transmits the measurement values to the predictive sequential calculation device 21 via the control network 26. When the time to execute a task arrives, the predictive sequential calculation device 21 first predicts the processing time required for executing the task using a prediction model based on the data transmitted by that time as input data of the task. As a result, the task is executed if the predicted processing time is equal to or less than the time slice allocated to the task. If the predicted processing time is larger than the time slice, a process (1) of increasing the time slice and/or a process (2) of thinning out the calculation content are performed so that the predicted processing time is equal to or less than the time slice. Then, the task is executed to calculate state estimation values. The state estimation values are transmitted to the system management server 22 and the local management server 24 as output data. In these processes, priorities are determined based on the alarm data from the power measurement equipment 22e and tasks are executed.

Next, the flow in which the system management server 22 uses the state estimation values will be described. When the state is unstable, the system management server 22 controls the respective equipments so that the range of equipments in which a power failure occurs is minimized. Moreover, the system management server 22 predicts the future state based an estimated state value (present state) and notifies the transformation equipment and the like of the predictions. The equipments of a transformer substation are controlled based on the notified information. Moreover, when the system management server 22 can directly operate a certain equipment, the system management server 22 controls power generation demand or amount.

Next, the flow in which the local management server 24 uses the state estimation values will be described. When power is not sufficient, the local management server 24 requests users to consume less power or to use a power generator. When too much power is supplied, the local management server 24 requests users to stop using a power generator.

<Functional Configuration>

Figure 22:
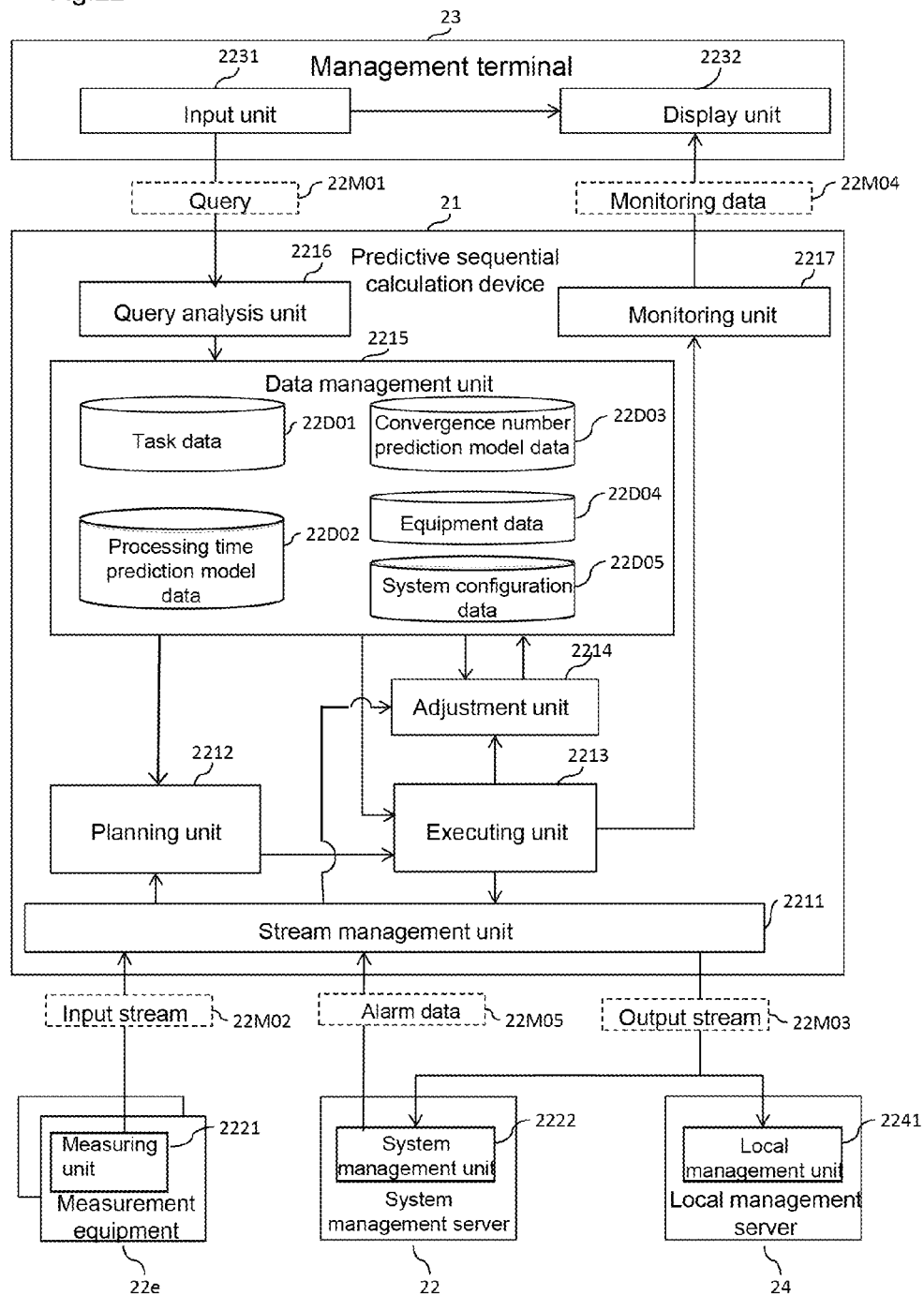
FIG. 22 is an explanatory diagram of a functional configuration according to the second embodiment.
Figure 23:
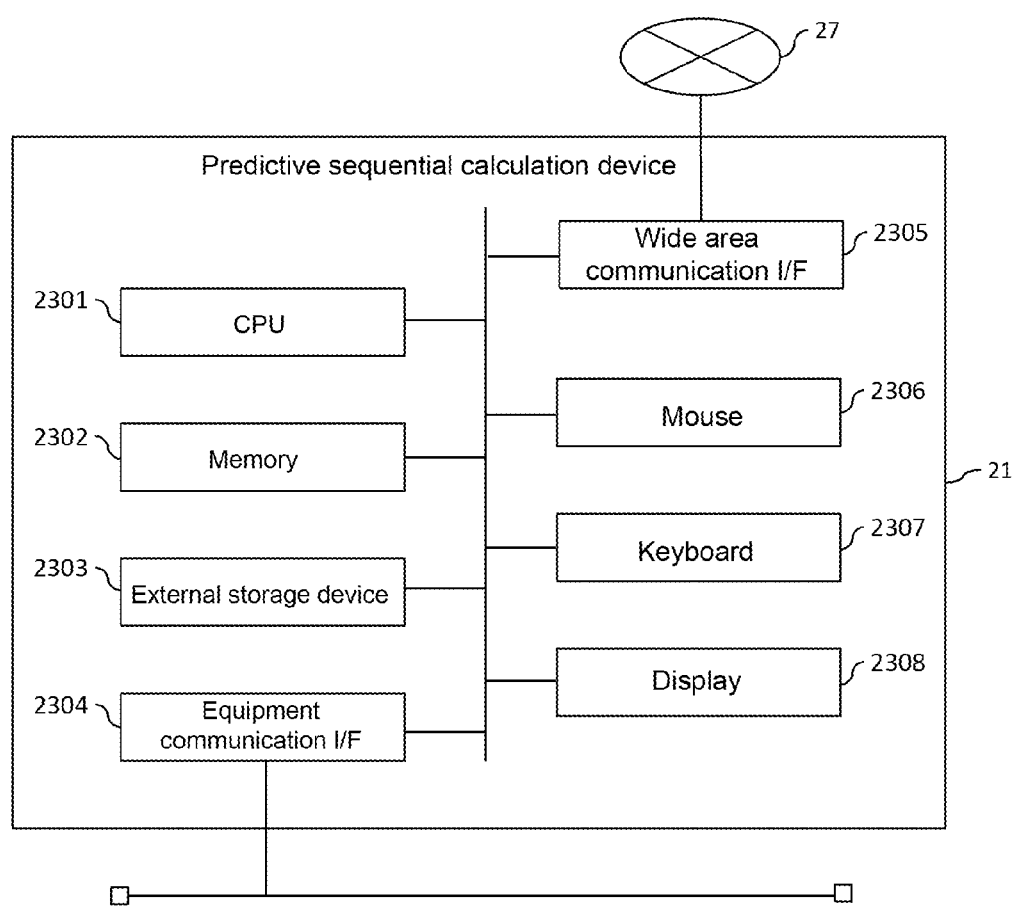
FIG. 23 is an explanatory diagram of hardware components of a predictive sequential calculation device according to the second embodiment.
Figure 24:
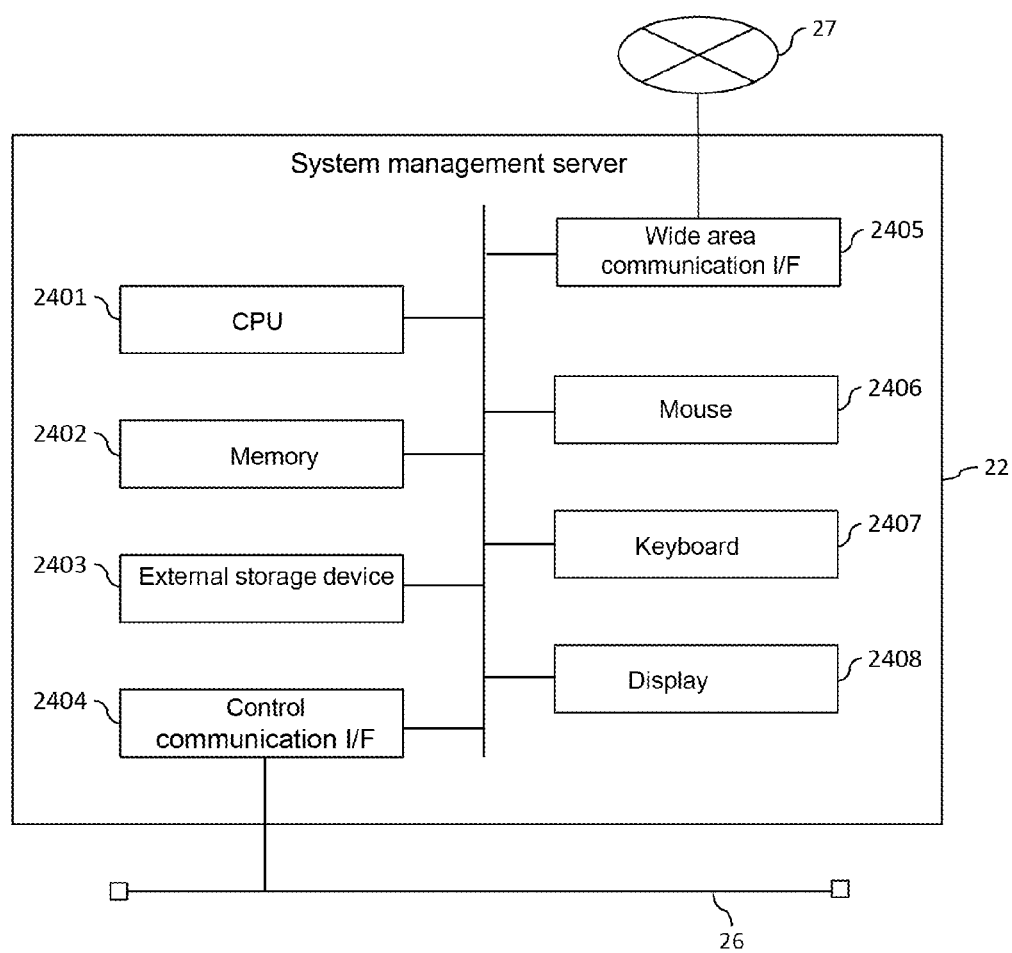
FIG. 24 is an explanatory diagram of hardware components of a system management server according to the second embodiment.
Figure 25:
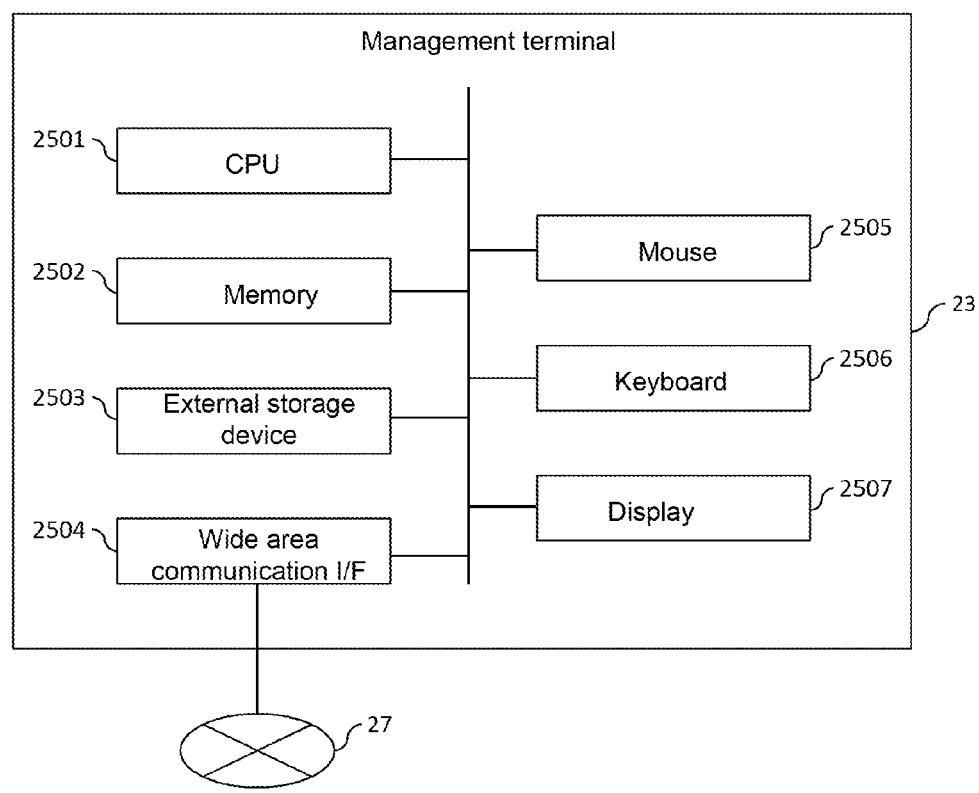
FIG. 25 is an explanatory diagram of hardware components of a management terminal according to the second embodiment.
Figure 26:
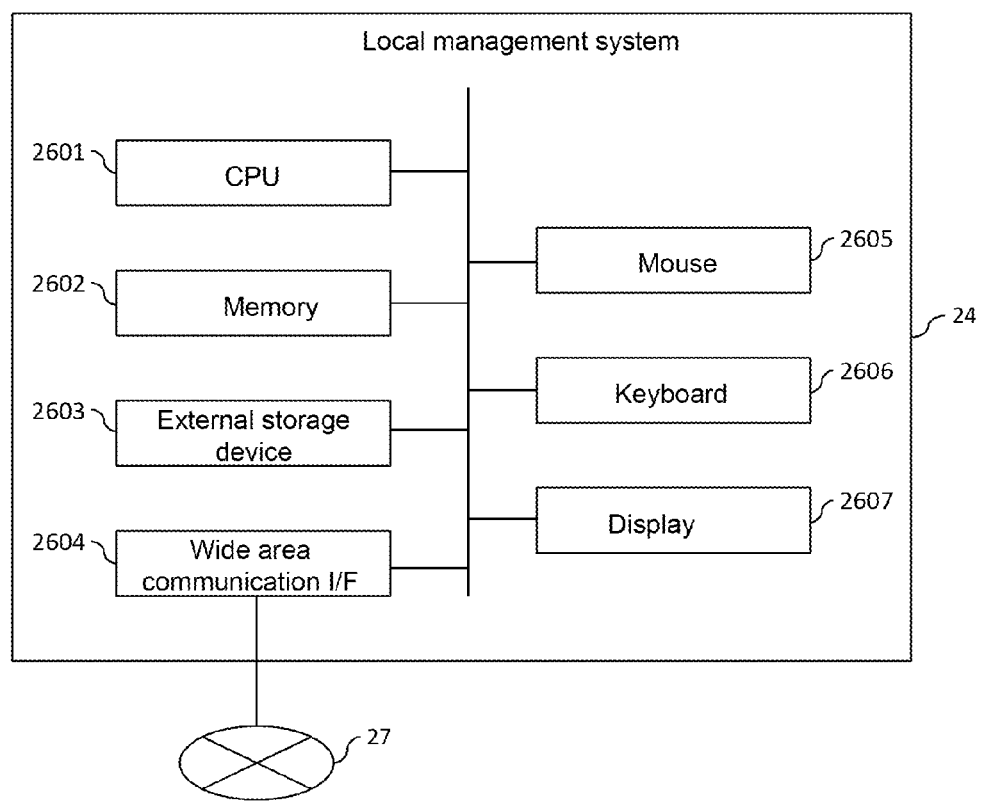
FIG. 26 is an explanatory diagram of hardware components of a local management system according to the second embodiment.

A functional configuration will be described with reference to FIG. 22. The predictive sequential calculation device 21 includes a stream management unit 2111, a planning unit 2212, an executing unit 2213, an adjustment unit 2214, a data management unit 2215, a query analysis unit 2216, and a monitoring unit 2217. The power measurement equipment 22e includes a measuring unit 2221. The system management server includes a system management unit 2222. The management terminal 23 includes an input unit 2231 and a display unit 2232. The local management server 24 includes a local management unit 2241.

<Function and Hardware>

Next, the correspondence between the functions and hardware components will be described with reference to FIGS. 22, 23, 24, 25, and 26.

The stream management unit 2111, the planning unit 2212, the executing unit 2213, the adjustment unit 2214, the data management unit 2215, the query analysis unit 2216, and the monitoring unit 2217, which constitute the predictive sequential calculation device 12, are realized when a CPU 2301 reads programs stored in a memory 2302 or an external storage device 2303 into a RAM area of the memory 2302 and controls an equipment communication I/F 2304 connected to the control network 26, a management terminal communication I/F 2305 connected to the wide area network 27, a mouse 2306, a keyboard 2307, and a display 2308.

The system management unit 2222 constituting the system management server 22 is realized when a CPU 2401 reads programs stored in a memory 2402 or an external storage device 2403 into a RAM area of the memory 2402 and controls an equipment communication I/F 2404 connected to the control network 26, a management terminal communication I/F 2405 connected to the wide area network 27, a mouse 2406, a keyboard 2407, and a display 2408.

The input unit 2231 and the display unit 2232 of the management terminal 23 are realized when a CPU 2501 reads programs stored in a memory 2502 or an external storage device 2503 into a RAM area of the memory 2502 and controls a management terminal communication I/F 2504 connected to the wide area network 27, a mouse 2505, a keyboard 2506, and a display 2507.

The local management unit 2241 constituting the local management system 24 is realized when a CPU 2601 reads into a RAM area of the memory 2602 programs stored in a memory 2602 or an external storage device 2603 and controls a management terminal communication I/F 2604 connected to the wide area network 27, a mouse 2605, a keyboard 2606, and a display 2607.

<Data Structure>

Next, a data structure will be described. The task data 22D01 has the same structure as the task data 2D01 of the first embodiment, the processing time prediction model data 22D02 has the same structure as the processing time prediction model data 2D02 of the first embodiment, the convergence number prediction model data 22D03 has the same structure as the convergence number prediction model data 2D03 of the first embodiment, the query 22M01 has the same structure as the query 2M01 of the first embodiment, and the monitoring data 22M04 has the same structure as the monitoring data 2M04 of the first embodiment. Thus, description thereof will not be provided.

Figure 27:
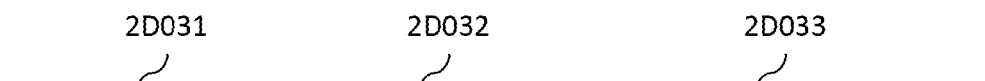
FIG. 27 is a diagram illustrating the structure of equipment data according to the second embodiment.

Equipment data 22D04 managed by the data management unit 2215 will be described with reference to FIG. 27. The equipment data 22D04 indicates parameters of the respective equipments required when performing state estimation, and includes an equipment ID 2D031 for identifying equipments, an equipment type 2D032 indicating the types of equipments, and an equipment parameter 2D033. For example, if the equipment is a power transmission line, the equipment type 2D032 is "power transmission line" and the equipment parameter 2D033 is admittance of the power transmission line. Moreover, if the equipment is a load equipment, the equipment type 2D032 is "load" and the equipment parameter is "load value" of the equipment. That is, the equipment parameter 2D032 is a set of parameters indicating the equipment properties corresponding to the equipment type 2D033.

The system configuration data 22D05 managed by the data management unit 2215 will be described with reference to FIG. 28. The system configuration data 22D04 indicates a system configuration required when performing state estimation and includes a starting equipment ID 2D031 and a terminating equipment ID 2D032. For example, when an equipment having the equipment ID=10 is connected to an equipment having the equipment ID=101, the system configuration data 22D04 has a value {10, 101}. The system configuration data 22D05 is used for, foe example, generation of an admittance matrix together with the equipment data 22D04.

The input stream 22M02 will be described with reference to FIG. 29. The input stream 22M02 is measurement values of various equipment states transmitted from the power measurement equipment 22e and includes an equipment ID 22M021, an equipment type 22M022, an effective power 22M023, a reactive power 22M024, a phase 22M025, a current 22M026, and a voltage 22M027.

The output stream 22M03 will be described with reference to FIG. 30. The output stream 22M03 is a state estimation value calculated by the predictive sequential calculation device 21 and includes an equipment ID 22M031, an equipment type 22M032, an effective power 22M033, a reactive power 22M034, a phase 22M035, a current 22M036, and a voltage 22M037.

Figure 31:
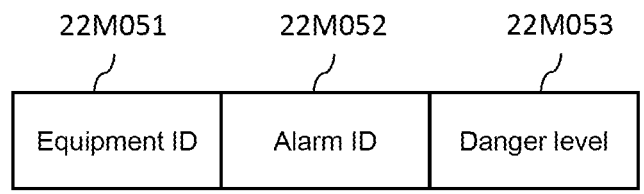
FIG. 31 is a diagram illustrating the structure of alarm data according to the second embodiment.

Next, the alarm data 22M05 will be described with reference to FIG. 31. The alarm data 22M05 indicates an abnormality of the respective equipments and includes an equipment ID 22M051, an alarm ID 22M052, and a danger level 22M053.

<Process Flow>

Next, a process flow will be described. Although an entire process flow is different in that the tasks are executed in units of respective areas including a plurality of equipments, since the processing contents are the same as those of the first embodiment, the description thereof will not be provided. Moreover, tasks are executed by referring to the equipment data 22D04 and the system configuration data 22D05. Moreover, the process flows relating to determination of the time slice, prediction of the processing time, and thinning-out are the same as those of the first embodiment, and description thereof will not be provided.

Next, a thin-out process will be described. Although the process flow of the thin-out process is the same as that of the first embodiment, the amount of data used for calculation is constant unless there is data loss due to characteristics of state estimation. Thus, thin-out is performed in such a way of dividing an area into a plurality of sub-areas, and a reciprocal of the number of sub-areas is defined as the amount of data. The area dividing logic itself is incorporated into the calculation logic of the query 22M01.

Figure 32:
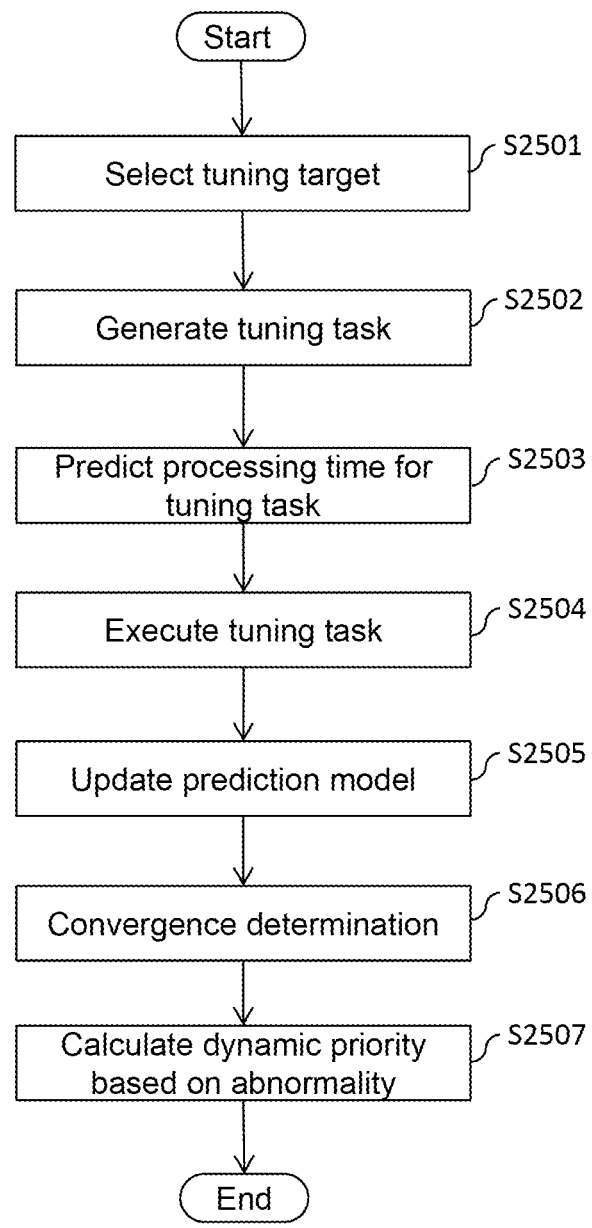
FIG. 32 is a flowchart illustrating an active tuning process according to the second embodiment.

The flow of active tuning will be described in detail with reference to FIG. 32 and Expression 5.

First, prior to processing, the adjustment unit 2214 of the predictive sequential calculation device 21 manages tasks according to three levels of queues (high, middle, and low-level queues) classified by the priority 2D015. One task at the top of a high-level queue is selected at the point in time when the present process starts (step S2501).

Subsequently, the past input stream of the selected task is acquired. The data amount of the past input stream is randomly increased or decreased using the sampling logic 2M015. Further, the number of iterative calculations is also changed randomly. In the present embodiment, although the data amount and the number of iterative calculations are changed randomly, the data amount and the number of iterative calculations may be changed based on a specific distribution (step S2502).

Subsequently, the predicted processing time for the data amount and the number of iterative calculations is calculated based on the processing time prediction model data 2D02 (step S2503).

Subsequently, a task (tuning task) in which the data amount and the number of iterative calculations are changed is executed. When the task is executed, the number of iterative calculations is stored at the point in time when convergence of the iterative calculation is detected (step S2504).

Subsequently, the parameters of Expression 1 are updated based on stochastic gradient descent using the data amount, the number of iterative calculations, and the processing time taken for execution. The updating may use another method (step S2505).

Subsequently, if the number of convergences of the iterative calculation is stored in step S504, the parameters of Expression 2 are updated based on stochastic gradient descent using the data amount and the number of convergences. The updating may use another method (step S2506).

Subsequently, a dynamic priority is calculated. The dynamic priority in the present embodiment is based on uncertainty and an abnormality of an equipment and is defined as Expression 5.

[Expression 5]

$$\text{(dynamic priority)} = \min(\text{maximum dynamic priority}, \text{floor}(k(((\text{prediction processing time})-(\text{real processing time}))^2)))$$

Here, the danger value is calculated based on the danger level 22M053 of the alarm data 22M05, and the largest danger level of equipments within the area is used. Further, the dynamic priority is added to a static priority determined in advance for each task to calculate a priority. Lastly, updating is implemented according to the dynamic priority and priority used for calculating a corresponding line of the task data 2D01, and the present process flow ends (step S2507).

As described above, the active tuning of the present embodiment is different from that of the first embodiment in that the priority is changed based on an abnormality of an equipment which is a calculation target. In the present embodiment, only the area that exhibits the occurrence of an equipment abnormality is prioritized, but the adjacent areas may also be prioritized. Moreover, when an associated task (for example, calculation for analyzing the trend of abnormalities) is executed in parallel, the task may also have a higher priority.

<Supplement of Advantageous Effects>

As described above, according to the present embodiment, the data amount and the number of iterative calculations can be controlled based on a predicted processing time of calculation according to a time slice allocated to the calculation. Thus, it is possible to execute the calculation while satisfying the real-time restrictions in a transitional period where the processing time starts increasing.

Moreover, since calculation resources are preferentially allocated to calculation associated with an abnormal equipment, the calculation can be executed without thinning out the data amount or the calculation contents.

Moreover, when an abnormality occurs, even if a time slice that is not sufficient for completely performing calculation is set to tasks relating to areas that are not associated with the abnormality, the additional time slice can be allocated to the predicted processing time and the priority if there is a room for calculation resources. Thus, it is possible to maintain high accuracy.

[Third Embodiment]

A third embodiment will be described. In the third embodiment, a power grid control system that calculates various property models will be described as an example.

<System Configuration>

Figure 33:
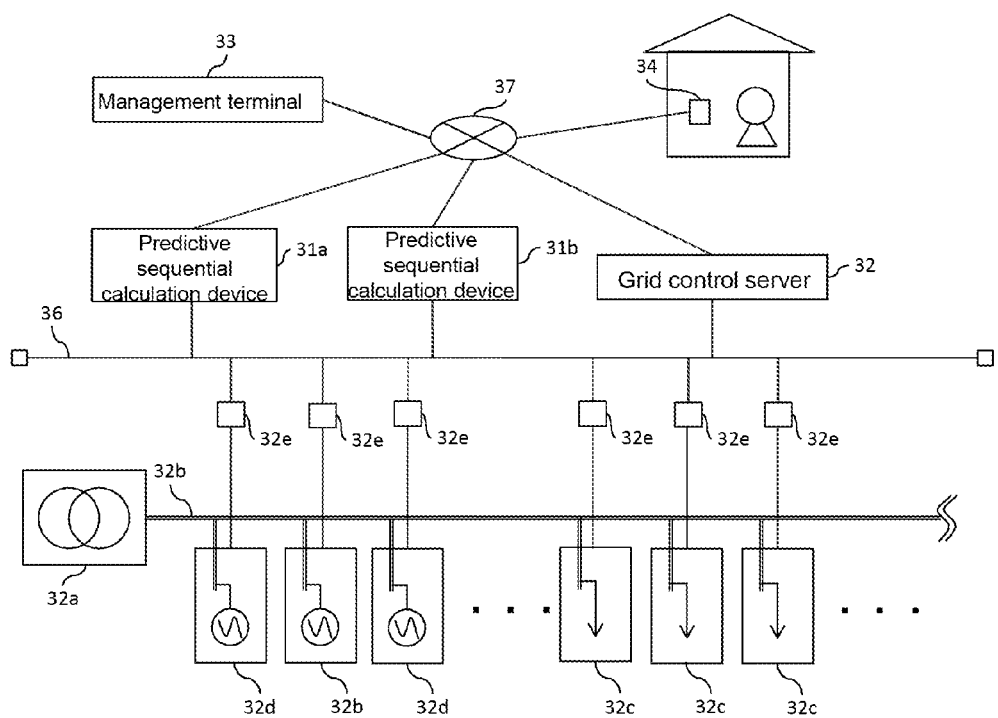
FIG. 33 is a block diagram of a system according to a third embodiment.

A system configuration of the present embodiment will be described with reference to FIG. 33. As illustrated in FIG. 33, a power grid control system includes predictive sequential calculation devices 31a and 31b, a grid control server 32, a management terminal 33, a user terminal 34, a transformation equipment 32a, a load equipment 32c, a power generation equipment 32d, and a distribution controller 32e. Here, the load equipment 32c is an equipment of consumers such as buildings or factories and a low-voltage transformation equipment. Moreover, the power generation equipment 32d is an equipment for generating power from solar power and wind power or using a cogenerator. Thus, practically, the load equipment 32c and the power generation equipment 32d may be installed together in a certain factory.

The transformation equipment 32a, the load equipment 32c, and the power generation equipment 32d are connected by a power distribution equipment 32b. Here, the power distribution equipment 32b is configured to include a power transmission line, a switch, and the like. The predictive sequential calculation devices 31a and 31b, the grid control server 32, and the distribution controller 32e are connected via a control network 36. Moreover, the predictive sequential calculation devices 31a and 31b, the grid control server 32, the management terminal 33, and the user terminal 34 are connected via a wide area network 37.

<Outline of Operation>

Next, the role of the power grid control system in the present embodiment will be described. The power grid control system stabilizes a system. For example, the power grid control system controls equipments so that the amount of the power generated by the power generation equipment 32d, flowing to a higher-voltage system does not exceed an acceptable amount. Further, the power grid control system performs demand response control for controlling consumer-side equipments so that power shortage resulting from a calamity or a change in atmospheric conditions does not affect the entire grid and performs demand-side management of performing control in harmonization with equipment characteristics to realize efficient management and assisting efficient management of consumer equipments.

Next, the flow of a basic process of the power grid control system will be described. First, prior to processing, the management terminal 33 registers a query for identification calculation (referred to as a task) for characteristic models relating to equipments and demands to the predictive sequential calculation devices 31a and 31b. A specific example of the task will be described in detail later. The process during execution is as follows. First, the distribution controller 32e transmits operation record data of various equipments to the predictive sequential calculation devices 31a and 31b. The predictive sequential calculation devices 31a and 31b execute tasks using the operation record data and transmit the results to the grid control server 32. The grid control server 32 determines optimal control values for the equipments and the request to consumers based on the analyzed characteristics. Moreover, the grid control server 32 transmits the control values to the respective equipments and sends the request contents to the user terminal 34.

Next, a specific example of the tasks of the predictive sequential calculation devices 31a and 31b will be described briefly. For example, in power generation using cogenerators, it is necessary to determine an output balance according to the fuel efficiency characteristics of respective power generation equipments. Thus, the output power to the fuel discharge amount per hour is regarded as an envelope and a fuel efficiency characteristic model is identified. As another example, in the case of performing photovoltaic power generation, it is necessary to predict how much output will be obtained. Thus, the output power to time is regarded as a linear regression model, and a power characteristic model is identified. As another example, in the case of requesting consumers to suppress power consumption, contract results with respect to a suppression request to respective consumers or a consumer group is regarded as a binomial distribution stochastic model, and a acceptance characteristic model is identified. Although some of these characteristic models are known as product specifications, the characteristic model may practically deteriorate during several years of use and may become different due to a change in usage environment. Thus, it is necessary to identify the characteristic model from the measured values of an installed equipment as described above. Moreover, in the present embodiment, although the characteristic model is presumed, a model that takes atmospheric conditions (seasons, temperatures, and weather) of photovoltaic power generation characteristics into consideration may be used, for example. Moreover, consumer characteristics (a mean power consumption amount and a family structure) and the like of the acceptance characteristics may be taken into consideration. Further, although only the fuel efficiency characteristics of the power generation equipment are considered, other characteristics such as response characteristics to a control command may be considered.

<Functional Configuration>

Figure 34:
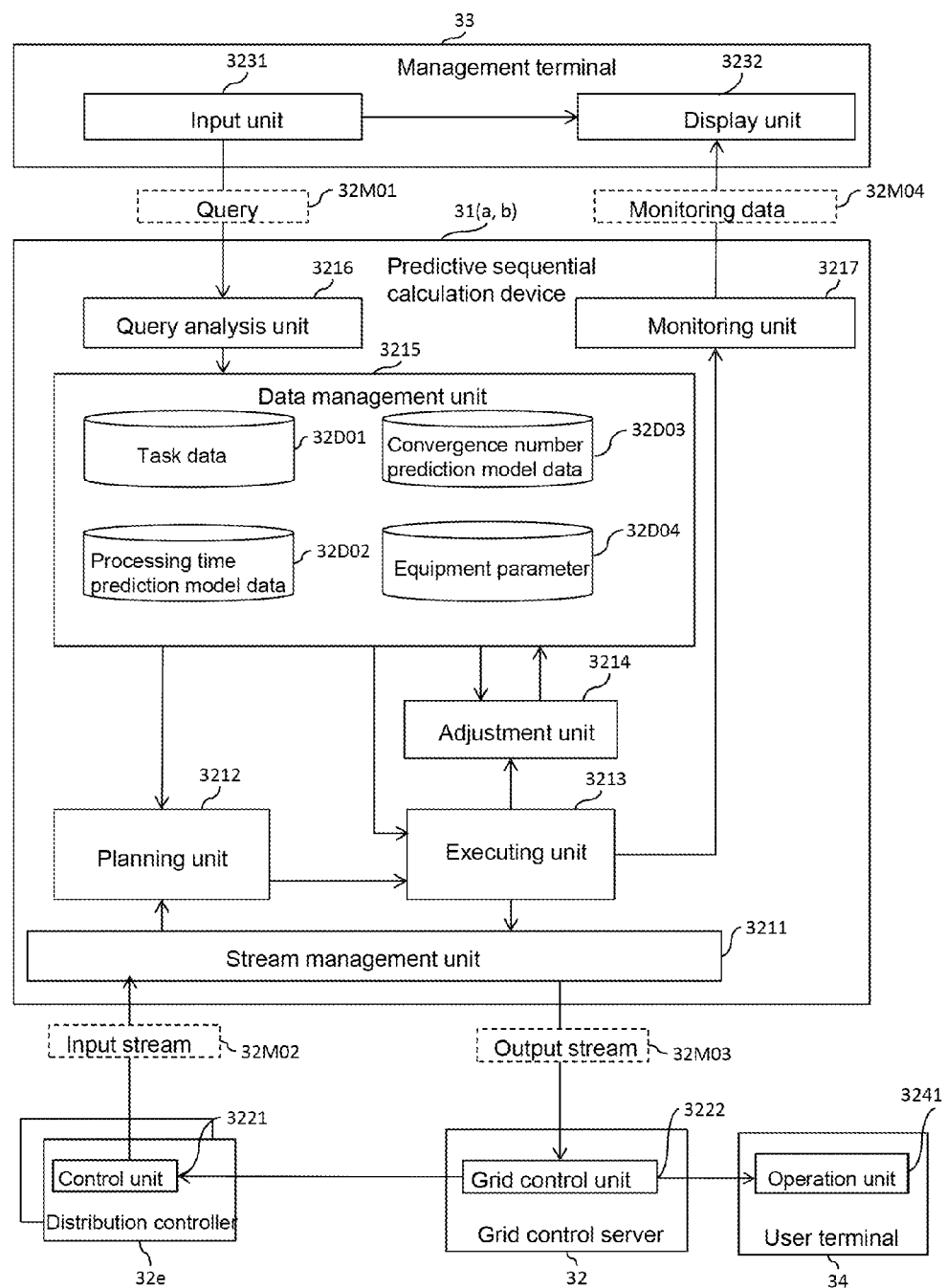
FIG. 34 is an explanatory diagram of a functional configuration according to the third embodiment.

A functional configuration will be described with reference to FIG. 34. The predictive sequential calculation device 31 includes a stream management unit 3211, a planning unit 3212, an executing unit 3213, an adjustment unit 3214, a data management unit 3215, a query analysis unit 3216, and a monitoring unit 3217. The distribution controller 32e includes a control unit 3221 and a grid control unit 3222. The user terminal 34 includes an operation unit 3441.

<Function and Hardware>

Figure 35:
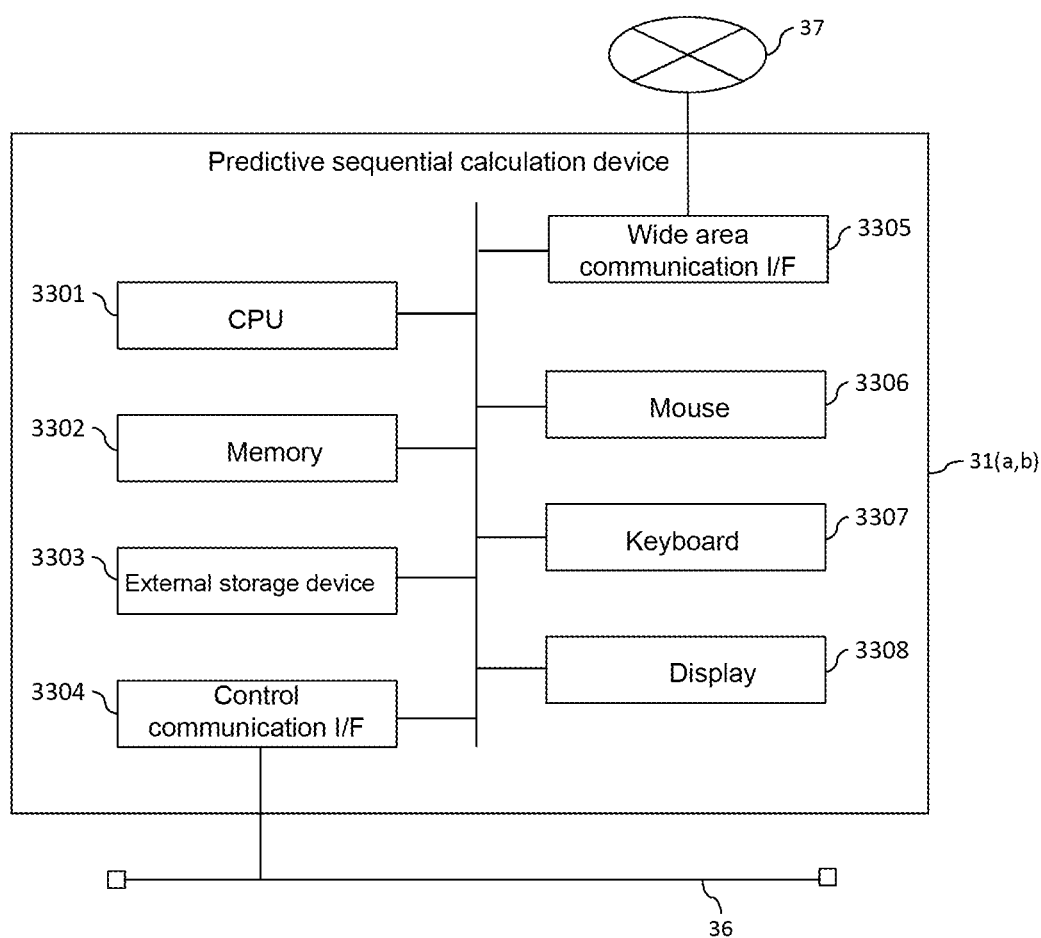
FIG. 35 is an explanatory diagram of hardware components of a predictive sequential calculation device according to the third embodiment.

Next, the correspondence between the functions and hardware components will be described. FIG. 35 illustrates a hardware configuration of the predictive sequential calculation devices 31a and 31b. The stream management unit 3211, the planning unit 3212, the executing unit 3213, the adjustment unit 3214, the data management unit 3215, the query analysis unit 3216, and the monitoring unit 3217 constituting the predictive sequential calculation device 31 are realized when a CPU 3301 reads programs stored in a memory 3302 or an external storage device 3303 into a RAM area of the memory 3302 and controls an equipment communication I/F 3304 connected to the control network 36, a management terminal communication I/F 3305 connected to the wide area network 37, a mouse 3306, a keyboard 3307, and a display 3308.

The control unit 3221 of the distribution controller 32e is realized when a CPU reads programs stored in a memory or an external storage device into a RAM area of the memory and controls an equipment communication connected to the control network 36.

The grid control unit 3222 of the grid control server 32 is realized when a CPU reads programs stored in a memory or an external storage device into a RAM area of the memory and controls an equipment communication connected to the control network, a management terminal communication I/F connected to the wide area network, a mouse, a keyboard, and a display.

The input unit and the display unit of the management terminal 33 are realized when a CPU reads programs stored in a memory or an external storage device into a RAM area of the memory and controls a management terminal communication I/F connected to the wide area network, a mouse, a keyboard, and a display.

The control unit 3411 of the user terminal 34 is realized when a CPU reads programs stored in a memory or an external storage device into a RAM area of the memory and controls a management terminal communication I/F connected to the wide area network, a mouse, a keyboard, and a display.

<Data Structure>

Next, a data structure will be described. The task data 32D01 has the same structure as the task data 2D01 of the first embodiment, the processing time prediction model data 32D02 has the same structure as the processing time prediction model data 2D02 of the first embodiment, the convergence number prediction model data 32D03 has the same structure as the convergence number prediction model data 2D03 of the first embodiment, the query 32M01 has the same structure as the query 2M01 of the first embodiment, and the monitoring data 32M04 has the same structure as the monitoring data 2M04 of the first embodiment. Thus, description thereof will not be provided.

Figure 38:
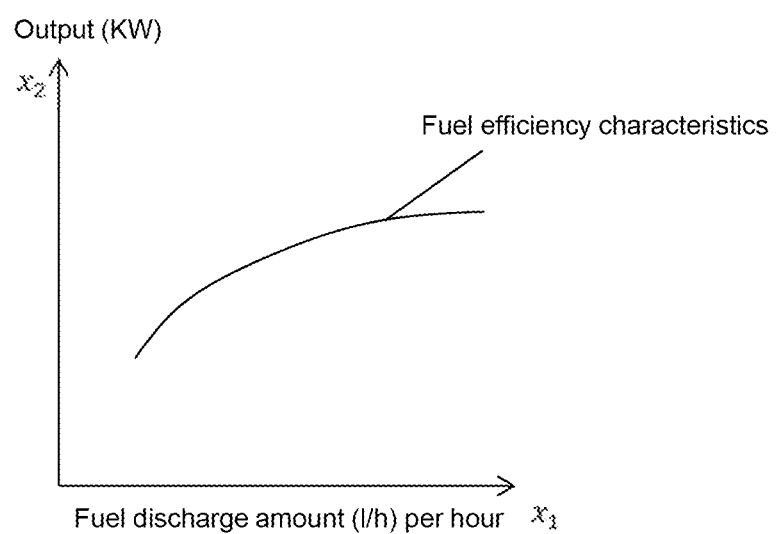
FIG. 38 is a diagram illustrating fuel efficiency characteristics of a cogenerator according to the third embodiment.

Equipment parameter 32D04 managed by the data management unit 3215 will be described. The equipment parameters are atypical data indicating the models and the initial values of respective characteristics such as fuel efficiency characteristics of the cogenerator, power generation characteristics of photovoltaic power generation equipments, and acceptance characteristics with respect to suppression requests. For example, in the case of the cogenerator, a curve as illustrated in FIG. 38 may be known as the fuel efficiency characteristics in a test before shipment. This is expressed by a quadratic linear regression model of which the input is x1 and the output is x2 as illustrated in Expression 8 by taking the easiness of identification into consideration.

[Expression 8]

$$x_1 = Ax_2^2 + Bx_2 + C$$

Figure 39:
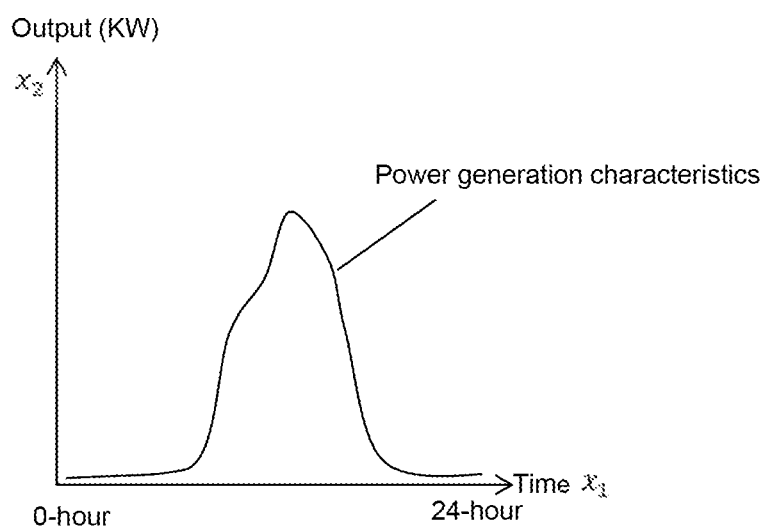
FIG. 39 is a diagram illustrating power generation characteristics of a photovoltaic power generation equipment according to the third embodiment.

In this case, the values of constant terms A, B, and C of Expression 8 are registered in the equipment parameter 32D04. As another example, as the power generation characteristics of photovoltaic power generation equipments, there is a case where the power generation amount when installed in similar areas is known as a curve as illustrated in FIG. 39. This is applied to a linear regression model of which the input is x1 and the output is x2 and which is based on a Gauss function as illustrated in Expression 9, and the parameters a, c, and uk of the basis functions and the value of a weight coefficient ak of each basis function are registered to the equipment parameter 32D04.
[Expression 9]

$$x_2 = \sum_{k=0}^{N} a_k \phi_k(x_1) \text{ where}$$

$$\phi_k = a\exp\left\{-\frac{(x-u_k)^2}{2c^2}\right\}$$

As another example, the acceptance characteristics with respect to suppression requests are obtained by dividing consumers in advance into groups (this group is referred to as a consumer group), extracting randomly consumers from each group, and performing a survey to identify whether the consumers accept the suppression request. It is assumed that the survey results show a distribution of the entire consumer group. In this case, the number of consumers and the acceptance ratio in a consumer group corresponding to n and p indicating the parameters of a binomial distribution expressed by Expression 10 for each consumer group are registered to the equipment parameter 32D04.
[Expression 10]

$$p[X=k] = \binom{n}{k} p_k (1-p)^{n-k}$$

Next, the input stream 32M02 will be described. The input stream 32M02 is atypical data indicating the operation records measured by the distribution controllers 32e of various equipments. For example, in the case of a cogenerator, the data include the fuel consumption per hour, a control command, the output power at that time, and the like.

Next, the output stream 32M03 will be described. The output stream 32M03 is atypical data indicating the parameters of models obtained by identification calculation for characteristic models of various equipments. For example, in the case of the cogenerator fuel efficiency characteristics, when the model is expressed by a quadratic polynomial, the output stream 32M03 is the coefficient data of a constant term, a first-order term, and a second-order term.

<Process Flow>

Figure 36:
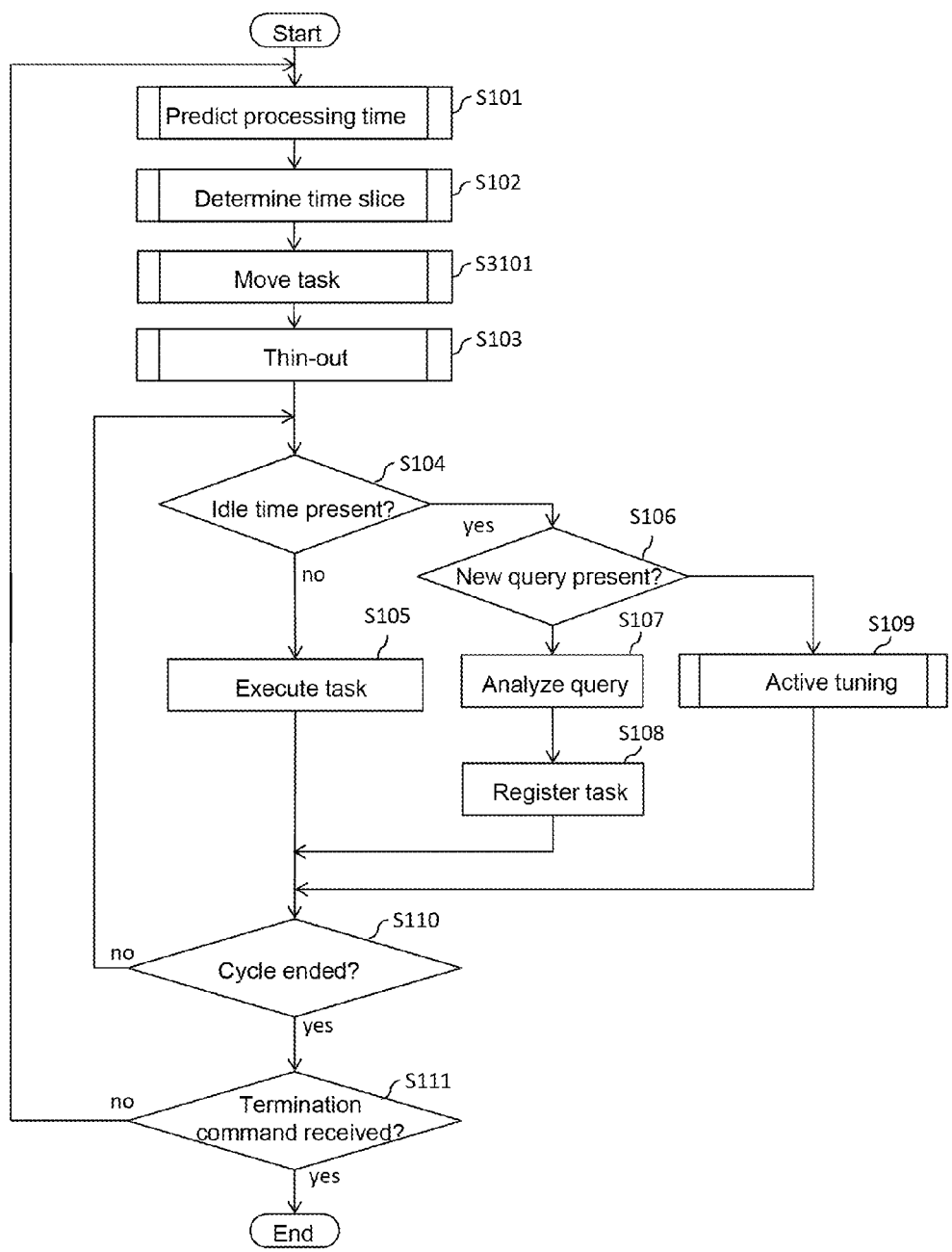
FIG. 36 is a flowchart illustrating an entire process of the third embodiment.

The flow of an entire process will be described with reference to FIG. 36. In this process flow, a task moving process of step S3101 is added between the time slice determining process of step S102 and the thin-out process of step S103 in the process flow of the first embodiment. The task calculation contents and the task moving process of step S3101 will be described later. Besides this, the process flows relating to prediction of the processing time, determination of the time slice, thinning-out, and the active tuning are the same as those of the first embodiment, and description thereof will not be provided.

Next, task calculation contents will be described. In the present embodiment, a task is to identify the parameters of respective characteristic models. For example, since the fuel efficiency characteristics of a cogenerator are expressed by a linear regression model, the parameters can be identified according to a stochastic gradient descent. Similarly, the power generation characteristics of photovoltaic power generation equipments can be identified by a stochastic gradient descent. The parameters of the acceptance characteristics of consumers with respect to the suppression request can be identified by the same method as the method of deriving parameters from a survey. That is, the number of consumers who actually received the suppression request and the ratio of the number of consumers who accepted the suppression request to the above number are calculated.

Figure 37:
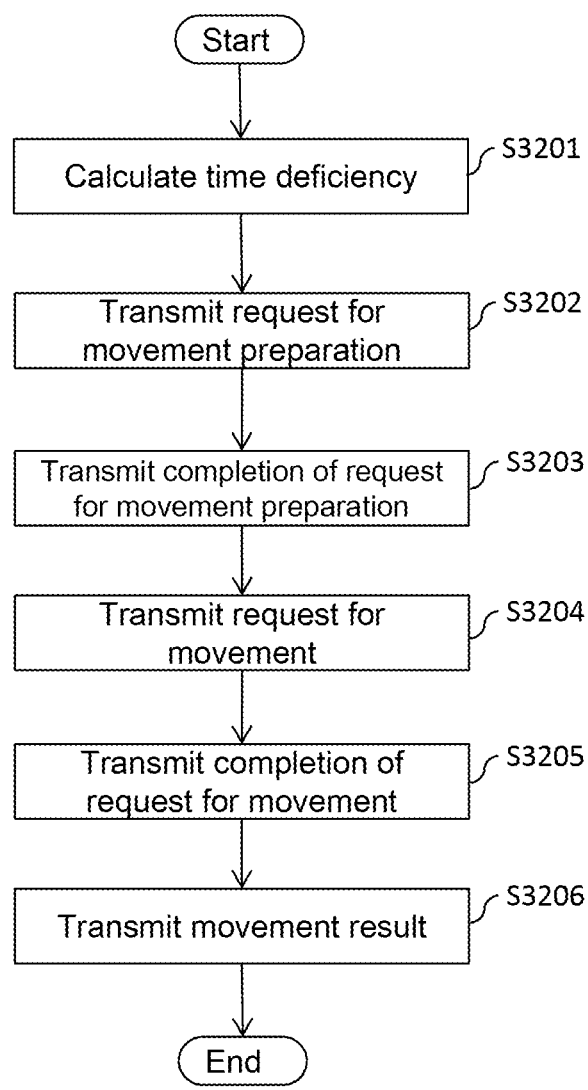
FIG. 37 is a flowchart illustrating a task moving process according to the third embodiment.

The flow of the task moving process of step S3101 will be described with reference to FIG. 37. First, the planning unit 3212 of the predictive sequential calculation device 31 calculates the sum of differences (referred to as time deficiencies) between the predicted processing time of respective tasks and the actually allocated time slices (step S3201).

Subsequently, when the time deficiency is equal to or larger than 0, one task (referred to as a moving task) having a lower priority is selected. Moreover, a movement preparation request for the moving task is issued to the other predictive sequential calculation device 31. When a movement preparation request or a movement request has already been issued, the request is not issued, and the flow proceeds to the next process (step S3202).

Subsequently, when the movement preparation request or the movement request has not been issued, it is checked whether a movement preparation request is received from the other predictive sequential calculation device 31. If the movement preparation request has been received, it is checked whether the time deficiency is 0 and a time slice is allocated to a moving task corresponding to the movement preparation request. If the time slice can be allocated, a notification of completion of the movement preparation is transmitted to the requesting predictive sequential calculation device 31. If the movement preparation request has not been received, nothing is performed, and the flow proceeds to the next step (step S3203).

Subsequently, when the movement preparation request is issued and the notification of completion of movement preparation is received from the other predictive sequential calculation device 31, a movement request is transmitted (step S3204).

Subsequently, when the movement preparation request or the movement request has not been issued, it is checked whether a movement request is received from the other predictive sequential calculation device 31. If the movement request is received, the corresponding moving task is executed. If the moving task has already been executed, a notification of completion of movement is transmitted to the requesting predictive sequential calculation device (step S3205).

Subsequently, if the movement request has been issued and the notification of completion of movement has been received from the other predictive sequential calculation device 31, a path change instruction is issued so that the input stream from the distribution controller 32e is transmitted to the requesting predictive sequential calculation device 31. After that, the requested moving task is deleted, and a moving task and a movement destination are transmitted to the management terminal 33 (step S3206).

All processes described above are asynchronously executed so as not to be blocked. In a case where there is no response to a request for a predetermined period or tasks cannot move as a result of not receiving any notification of completion, a request is issued again to the other predictive sequential calculation device 31 in the subsequent process flow.

A specific example in which a task is moved from the predictive sequential calculation device 31a to the predictive sequential calculation device 31b will be described. First, the predictive sequential calculation device 31a calculates a time deficiency. When the time deficiency is equal to or larger than 0, the predictive sequential calculation device 31a transmits a movement preparation request to the predictive sequential calculation device 31b. The predictive sequential calculation device 31b having received the movement preparation request checks whether a time deficiency does not occur and a time slice is allocated to a requested moving task and transmits a notification of completion of movement preparation to the predictive sequential calculation device 31a if the measured value is executable. The predictive sequential calculation device 31a having received the notification of completion transmits a movement request to the predictive sequential calculation device 31b. In response to this, the predictive sequential calculation device 31b executes a moving task. When it is possible to check the execution of the moving task, the predictive sequential calculation device 31b transmits a notification of completion of movement to the predictive sequential calculation device 31a. The predictive sequential calculation device 31a having received the notification of completion issues a path change instruction to the distribution controller 32e so that the input stream is transmitted to the predictive sequential calculation device 31b. After that, the moving task is deleted, and the movement results are reported to the management terminal 33.

<Supplement of Advantageous Effects>

As described above, according to the present embodiment, the data amount and the number of iterative calculations can be controlled based on a predicted processing time of calculation according to a time slice allocated to the calculation. Thus, it is possible to execute the calculation while satisfying the real-time restrictions in a transitional period where the processing time starts increasing.

Moreover, when a time slice tantamount to a predicted processing time is not allocated, tasks can be moved to another predictive sequential calculation device. Thus, when there is a plurality of predictive sequential calculation devices, it is possible to implement autonomous adjustment of the calculation load distribution and calculation in which thin-out occurs as less as possible in an entire system. That is, even when the smallest time slice is not suitable for an actual situation due to an environmental change, it is possible, for example, to reduce deterioration of calculation accuracy. As a result, it is possible to perform control according to characteristics of equipments or users and to improve the accuracy of demand response control and demand-side management.

REFERENCE SIGNS LIST

11 Predictive sequential calculation device
12 Equipment group
13 Management terminal
14 Control network
15 Wide area network
211 Stream management unit
212 Planning unit
213 Executing unit
214 Adjustment unit
215 Data management unit
216 Query analysis unit
217 Monitoring unit
221 Control unit
231 Input unit
232 Display unit
21 Predictive sequential calculation device
22 Stream management server
23 Management terminal
24 Local management server
26 Control network
27 Wide area network
2211 Stream management unit
2212 Planning unit
2213 Executing unit
2214 Adjustment unit
2215 Data management unit
2216 Query analysis unit
2217 Monitoring unit
2221 Measuring unit
2231 Input unit
2232 Display unit
2222 System management unit
2241 Local management unit
31a Predictive sequential calculation device
31b Predictive sequential calculation device
32 Grid control server
32e Distribution controller
33 Management terminal
34 User terminal
36 Control network
37 Wide area network
3211 Stream management unit
3212 Planning unit
3213 Executing unit
3214 Adjustment unit
3215 Data management unit
3216 Query analysis unit
3217 Monitoring unit
3221 Control unit
3222 Grid control unit
3231 Input unit
3232 Display unit
3241 Operation unit

The invention claimed is:

1. A real time calculation method for a processor, the method comprising:
receiving a smallest time slice indicating a processing completion time;
constantly receiving a plurality of data items that are operands to a calculation;
retrieving a first predication model from a plurality of prediction models stored in a memory, wherein the first predication model correlates an amount of data and a calculation processing time;
calculating a first calculation processing time based on an amount of data included in the plurality of data items and the first prediction model;
determining a new time slice by selectively adding a prescribed period to the smallest time slice based on a priority of the plurality of data items;
comparing the first calculation processing time and the new time slice to determine if the first calculation processing time exceeds the new time slice;
decreasing the amount of data when the first calculation processing time exceeds the new time slice, wherein the decreasing the amount of data includes:
determining number of iterations based on a convergence model,
retrieving a second prediction model from the plurality of prediction models stored in the memory, wherein the second prediction model correlates a calculation processing time, an amount of data, and a number of iterations, calculating a second calculation processing time based on the amount of data, and the number of iterations and the second prediction model, comparing the second calculation processing time to the new time slice to produce a comparison result, and decreasing the amount of data by a prescribed amount to generate a second amount of data when the comparison result indicates the second calculation processing time exceeds the new time slice;

automatically executing the calculation on the amount of data to generate a calculation result when the first calculation processing time does not exceed the new time slice; and automatically executing the calculation on the second amount of data to generate the calculation result when the first calculation processing time exceeds the new time slice.

2. The method according to claim 1, wherein
the second prediction model incorporates a function that reflects a change in a number of iterative calculations on a change in the data amount.

3. The method according to claim 1, wherein the calculation is executed by a first predictive sequential calculation device of a plurality of predictive sequential calculation devices, and the method further comprises:
when the second calculation processing time exceeds the new time slice, the calculation is executed in a second predictive sequential calculation device from the plurality of sequential calculation devices.

4. The method according to claim 1, further comprising
tuning the second prediction model to generate a corrected second prediction model, by performing a repetition of a previously performed calculation using a different amount of data or a different number of iterations; and
saving the corrected second prediction model to the memory.

5. The method according to claim 4, wherein
the prediction model is provided for each calculation, and the tuning is performed starting from a prediction model having lower prediction accuracy among the plurality of prediction models stored in the memory.

6. The method according to claim 1, further comprising:
detecting when an abnormality has occurred in a physical equipment associated with the plurality of data items, and
increasing the priority of the plurality of data items when the abnormality has occurred.

7. The method according to claim 1, further comprising
transmitting the amount of data used for the calculation to an external device other than a device that performs the calculation; and
displaying the amount of data used for the calculation on the external device.

8. A predictive sequential calculation device, comprising:
a communication unit, wherein the communication unit:
receives a smallest time slice indicating a processing completion time and
constantly receives a plurality of data items that are operands to a calculation;
a planning unit, wherein the planning unit:
retrieves a first prediction model from a plurality of prediction models stored in a memory, wherein the first prediction model correlates an amount of data and a calculation processing time;

calculates a first calculation processing time based on an amount of data included in the plurality of data items and the first prediction, determines a new time slice by selectively adding a prescribed period to the smallest time slice based on a priority of the plurality of data items, compares the first calculation processing time and the new time slice to determine if the first calculation processing time exceeds the new time slice, decreases the amount of data when the first calculation processing time exceeds the new time slice, by performing a thinning out process, wherein the thinning out process includes:
determining a number of iterations based on a convergence model,
retrieving a second prediction model from the plurality of prediction models stored in the memory, wherein the second prediction model that correlates a calculation processing time, an amount of data, and a number of iterations,
calculating a second calculation processing time based on the amount of data, and the number of iterations and the second prediction model,
comparing the second calculation processing time to the new time slice to produce a comparison result, and
decreasing the amount of data by a prescribed amount to produce a second amount of data when the comparison result indicates the second calculation processing time exceeds the new time slice; and an executing unit, wherein the executing unit:
receives the amount of data from the planning unit and automatically performs the calculation on the amount of data when the first calculation processing time does not exceed the new time slice, and
receives the second amount of data from the planning unit and automatically performs the calculation on the second amount of data when the first calculation processing time exceeds the new time slice.

9. The predictive sequential calculation device according to claim 8, wherein the second prediction model incorporates a function that reflects a change in a number of iterative calculations on a change in the amount of data.

10. The predictive sequential calculation device according to claim 8, further comprising:
a tuning unit that corrects the prediction model, wherein the tuning unit tunes the second prediction model to generate a corrected second prediction model, by performing repetition of a previously performed calculation using a different amount of data or a different number of iterations; and
saves the corrected second prediction model to the memory.

11. The predictive sequential calculation device according to claim 10, wherein
the prediction model is provided for each calculation, and the tuning unit starts from a prediction model having lower prediction accuracy among the plurality of prediction models stored in the memory.

12. The predictive sequential calculation device according to claim 8, wherein the planning unit further:
detects when an abnormality has occurred in a physical equipment associated with the plurality of data items, and
increases the priority of the plurality of data when the abnormality has occurred.

13. A predictive sequential calculation system comprising:
the predictive sequential calculation device according to claim 8; and
a display device, wherein
the display device is configured to receive the amount of data used for the calculation and display the amount of data.

14. A predictive sequential calculation system comprising:
a plurality of the predictive sequential calculation device according to claim 10, wherein the plurality includes a first predictive sequential calculation device and a second predictive sequential calculation device; and
a display device, wherein
when the second calculation processing time of the first predictive sequential calculation device exceeds the new time slice, the calculation is executed in the second predictive sequential calculation device.

15. The predictive sequential calculation system according to claim 14, wherein
the predictive sequential calculation device and the display device are connected using a wide area network.

* * * * *